(12) United States Patent
Deguchi et al.

(10) Patent No.: US 12,339,751 B2
(45) Date of Patent: Jun. 24, 2025

(54) STORAGE SYSTEM AND MANAGEMENT METHOD

(71) Applicant: Hitachi, Ltd., Tokyo (JP)

(72) Inventors: Akira Deguchi, Tokyo (JP); Masahiro Arai, Tokyo (JP); Hideyuki Koseki, Tokyo (JP)

(73) Assignee: HITACHI VANTARA, LTD., Yokohama (JP)

(*) Notice: Subject to any disclaimer, the term of this patent is extended or adjusted under 35 U.S.C. 154(b) by 0 days.

(21) Appl. No.: 18/115,881

(22) Filed: Mar. 1, 2023

(65) Prior Publication Data

US 2024/0036989 A1 Feb. 1, 2024

(30) Foreign Application Priority Data

Jul. 27, 2022 (JP) .................................. 2022-119440

(51) Int. Cl.
*G06F 11/20* (2006.01)
*G06F 11/14* (2006.01)

(52) U.S. Cl.
CPC ...... *G06F 11/1469* (2013.01); *G06F 11/2025* (2013.01); *G06F 2201/805* (2013.01)

(58) Field of Classification Search
CPC ............ G06F 11/1469; G06F 11/2025; G06F 11/2033; G06F 11/2028; G06F 11/2038; G06F 11/2041

See application file for complete search history.

(56) References Cited

U.S. PATENT DOCUMENTS

| | | | |
|---|---|---|---|
| 10,592,268 B2 | 3/2020 | Nasu et al. | |
| 11,409,622 B1* | 8/2022 | Kaushik | G06F 11/2069 |
| 2005/0204183 A1* | 9/2005 | Saika | G06F 11/2025 |
| | | | 714/4.11 |
| 2010/0064168 A1* | 3/2010 | Smoot | G06F 11/2069 |
| | | | 714/6.12 |
| 2011/0295809 A1* | 12/2011 | Tatebe | G06F 11/1456 |
| | | | 711/E12.001 |
| 2011/0314239 A1* | 12/2011 | Kono | G06F 11/2094 |
| | | | 711/E12.103 |

(Continued)

FOREIGN PATENT DOCUMENTS

| | | |
|---|---|---|
| JP | 2012-3544 A | 1/2012 |
| JP | 2018-129074 A | 8/2018 |

(Continued)

OTHER PUBLICATIONS

Japanese Office Action received in corresponding Japanese Application No. 1022-119440 dated Jan. 30, 2024.

(Continued)

*Primary Examiner* — Yolanda L Wilson
(74) *Attorney, Agent, or Firm* — MATTINGLY & MALUR, PC

(57) ABSTRACT

A management server stops a sub-server in advance and prepares a sub-storage that operates in response to a request from the sub-server at the time of transition at which a business process of using data stored in a regular storage is performed in the sub-server. The management server recovers data using recovery data stored in an object storage and stores the data in the sub-storage and starts the sub-server.

2 Claims, 25 Drawing Sheets

(56) References Cited

U.S. PATENT DOCUMENTS

| | | | | |
|---|---|---|---|---|
| 2012/0023301 A1* | 1/2012 | Miyagaki | .............. | G06F 3/0665 |
| | | | | 711/170 |
| 2013/0179530 A1* | 7/2013 | Nomura | .............. | G06F 11/2069 |
| | | | | 709/213 |
| 2014/0317059 A1* | 10/2014 | Lad | .................... | G06F 11/1458 |
| | | | | 707/649 |
| 2021/0117295 A1 | 4/2021 | Sharma et al. | | |
| 2021/0334181 A1 | 10/2021 | Satoyama et al. | | |

FOREIGN PATENT DOCUMENTS

| | | | | |
|---|---|---|---|---|
| JP | 2021-174392 A | 11/2021 | | |
| WO | WO-2011148524 A1 * | 12/2011 | .............. | G06F 11/20 |
| WO | 2016/162916 A1 | 10/2016 | | |

OTHER PUBLICATIONS

Japanese Office Action received in corresponding Japanese Application No. 2022-119440 dated Sep. 10, 2024.

* cited by examiner

FIG. 9
STATE A
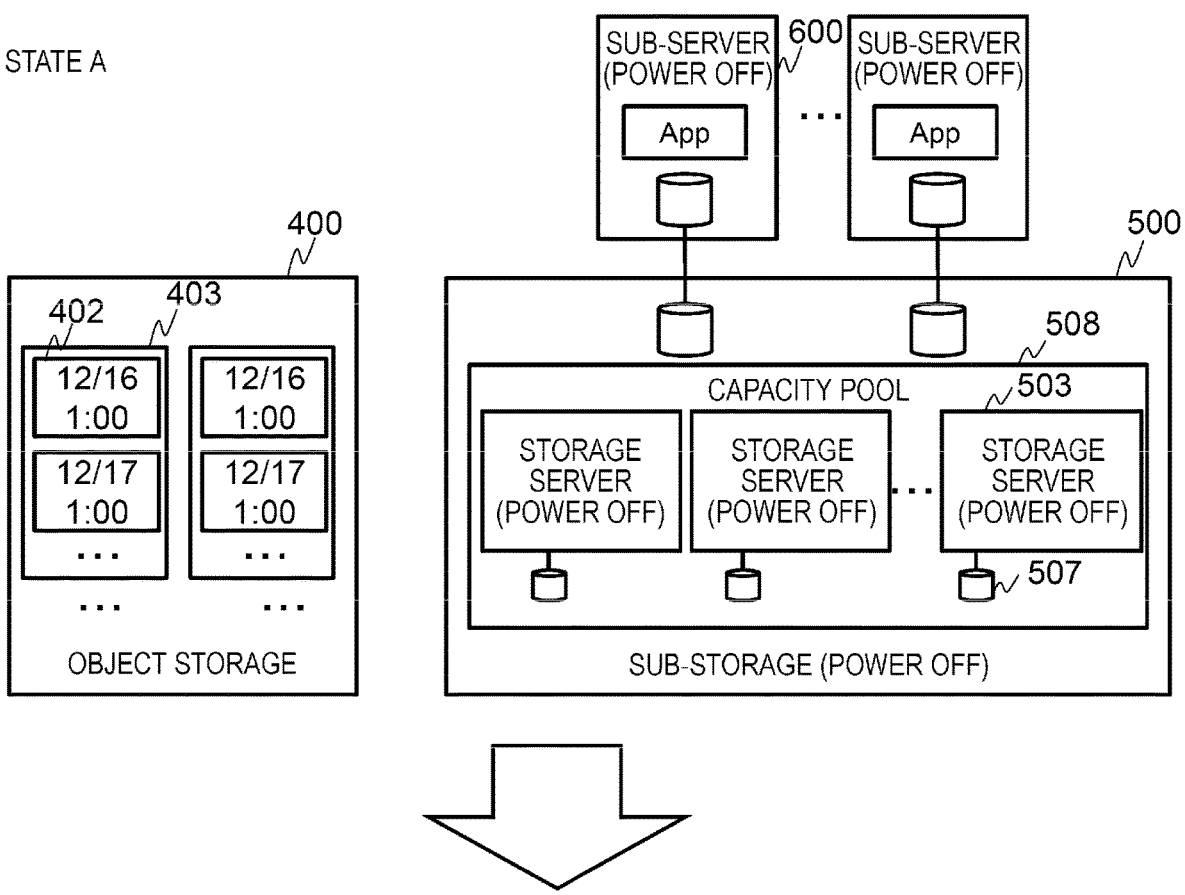
STATE B
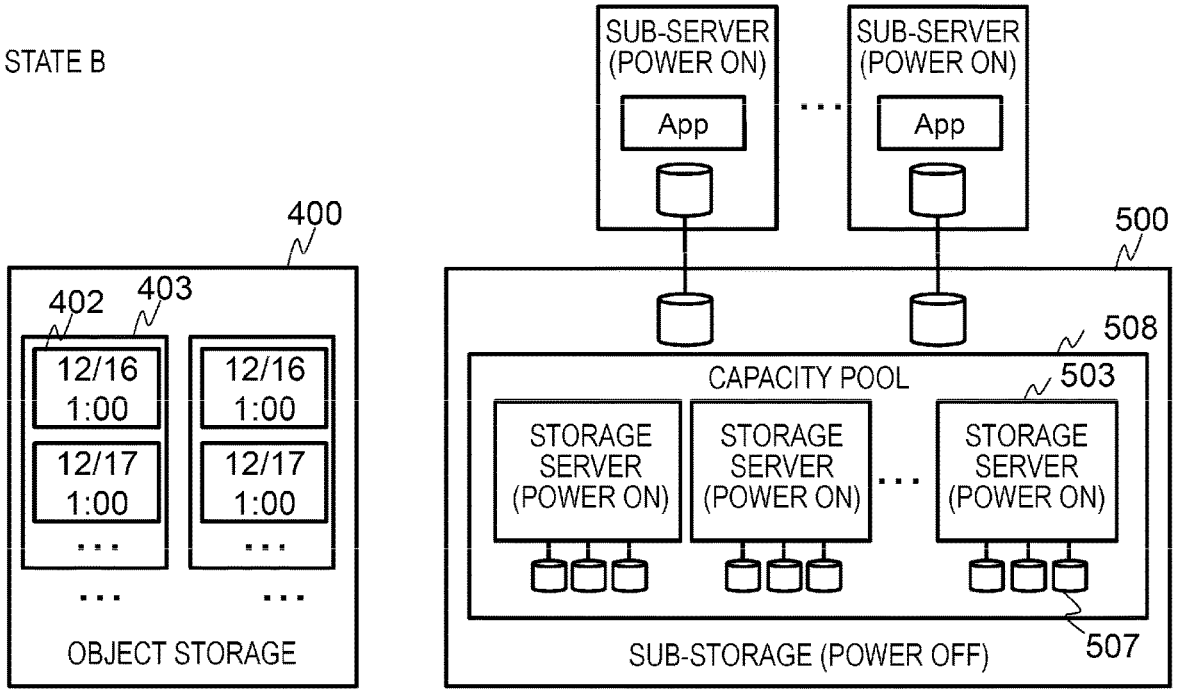

FIG. 12

| REGULAR STORAGE NUMBER 801 | REGULAR VOLUME NUMBER 802 | SUB-STORAGE NUMBER 803 | SUB-VOLUME NUMBER 804 | OBJECT BUCKET NUMBER 805 |
|---|---|---|---|---|
| 1-1 | 1 | 2-1 | 1 | A |
|  | 2 |  | 2 |  |
|  | 3 |  | 3 |  |
| ... | ... | ... | ... | ... |

5011 PAIR RELATION MANAGEMENT TABLE

| REGULAR STORAGE NUMBER 811 | SUB-STORAGE | | |
|---|---|---|---|
|  | NUMBER OF STORAGE SERVERS 811 | INSTANCE TYPE 813 | CAPACITY 814 |
| 1 | 10 nodes | xlarge | 2000GB |
| 2 | ... | ... | ... |
| 3 | ... | ... | ... |
| ... | ... | ... | ... |

5012 STORAGE ASSOCIATION TABLE

FIG. 19
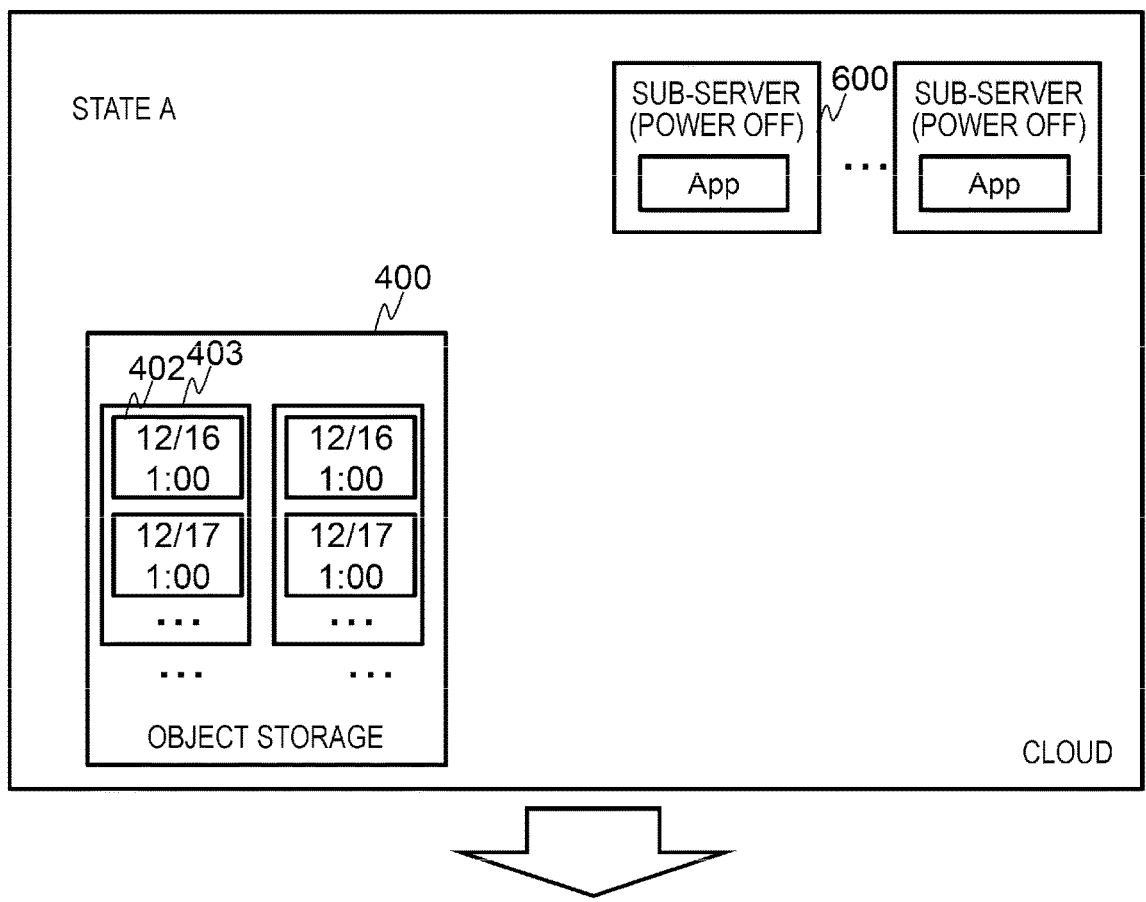
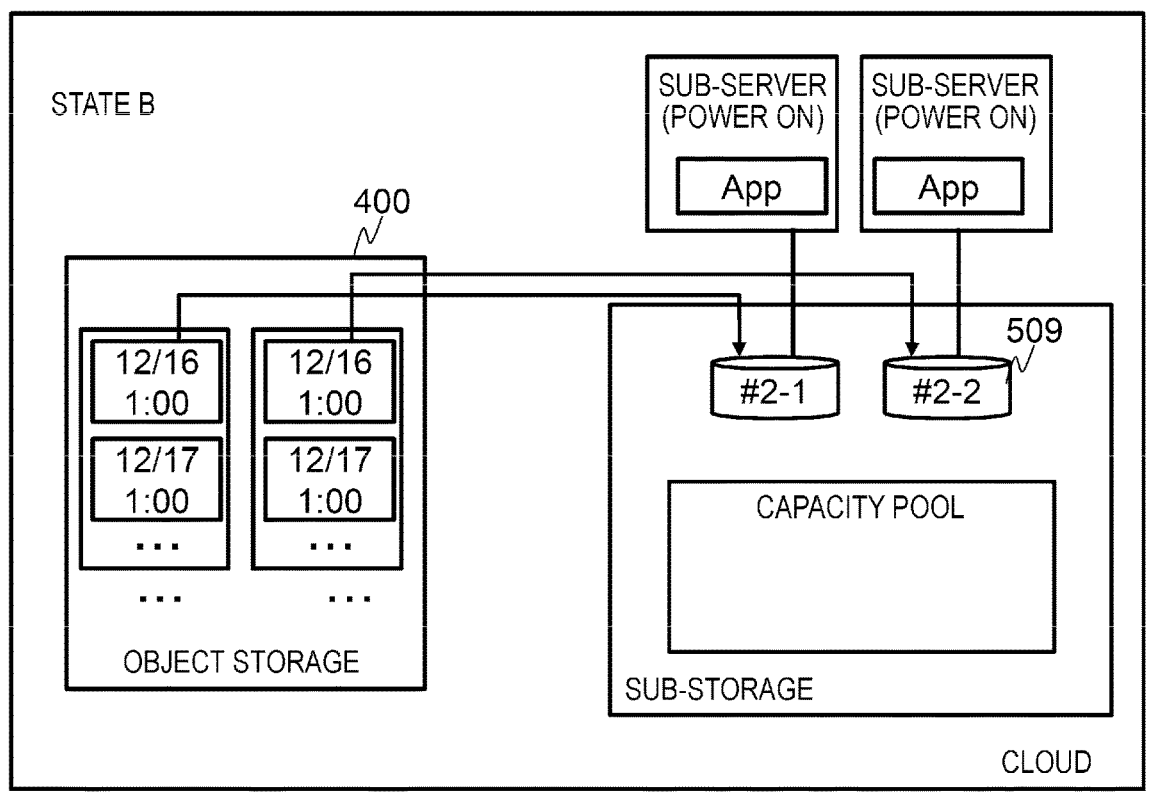

FIG. 20

| 901 REGULAR STORAGE NUMBER | 902 FAILOVER GROUP | 903 REGULAR VOLUME NUMBER | 904 SIZE | 905 BUCKET |
|---|---|---|---|---|
| 1 | 1 | 1 | 500GB | A |
| 1 | 1 | 2 | 500GB | A |
| 1 | 2 | 3 | 1000GB | A |
| ... | ... | ... | ... | ... |

5013 PROTECTION SUBJECT MANAGEMENT TABLE

| 911 REGULAR VOLUME NUMBER | 912 REGULAR SERVER | 913 SUB-SERVER |
|---|---|---|
| 1 | SERVER 1-1 | SERVER 2-1 |
| 2 | SERVER 1-1 | SERVER 2-1 |
| 3 | SERVER 1-2 | SERVER 2-2 |
| ... | ... | ... |

5014 SERVER VOLUME ASSOCIATION TABLE

FIG. 21

| SUB-STORAGE NUMBER 921 | REGULAR STORAGE NUMBER 922 | FAILOVER GROUP 923 | SHARABLE INFORMATION 924 | AVAILABILITY RATE 925 |
|---|---|---|---|---|
| 1 | 1 | 1,2 | NO | 80% |
| 1 | 1 | 3 | YES | 60% |
| 1 | 2 | 1 | NO | 0% |
| ... | ... | ... | ... | ... |

5015 SUB-STORAGE MANAGEMENT TABLE

STORAGE SYSTEM AND MANAGEMENT METHOD

CROSS-REFERENCE TO RELATED APPLICATION

The present application claims priority from Japanese application JP2022-119440, filed on Jul. 27, 2022, the contents of which is hereby incorporated by reference into this application.

BACKGROUND OF THE INVENTION

1. Field of the Invention

The present disclosure relates to a storage system and a management method.

2. Description of Related Art

Some storage systems have functions of quickly restarting business processes which have been performed on regular sites such as on-premise systems constructed in data centers of users by using sub-sites provided separately from the regular sites as purposes of disaster recovery or the like. For example, JP2018-129074A discloses a storage system that restarts business through a business process on a sub-site by a cloud system when a failure occurs in resources of an on-premise system.

In recent years, by implementing a sub-site in a public cloud, a reduction in a cost related to construction of the sub-site is widely achieved. However, when a sub-site is constructed in a public cloud, a server, a storage apparatus, and the like configured in the sub-site are charged in accordance with an operational time of the server, a storage capacity, or the like. Therefore, there is concern of an operational cost of the sub-site becoming expensive.

SUMMARY OF THE INVENTION

An object of the present disclosure is to provide a storage system and a management method capable of reducing an operational cost of a sub-site.

According to an aspect of the present disclosure, a storage system includes: a first storage apparatus configured to store data in response to a read/write request from a first host; a recovery storage apparatus configured to store recovery data for recovering the data; and a management apparatus configured to cause a second host to perform a business process using the data. The second host is stopped in advance. When the second host is caused to perform the business process, the management apparatus prepares a second storage apparatus, causes the second storage apparatus to recover and store the data using the recovery data, and starts the second host based on control information for designating the second storage apparatus operating in response to a request from the second host.

According to the present invention, it is possible to reduce an operational cost of a sub-site.

BRIEF DESCRIPTION OF THE DRAWINGS

FIG. 9 is a diagram illustrating an example of a failover process;

FIG. 12 is a diagram illustrating examples of a pair relation management table and a storage association table;

FIG. 19 is a flowchart illustrating another example of the failover process;

FIG. 20 is a diagram illustrating examples of a protection subject management table and a server volume association table;

FIG. 21 is a diagram illustrating an example of a sub-storage management table;

DESCRIPTION OF EMBODIMENTS

Hereinafter, embodiments of the present disclosure will be described with reference to the drawings.

Hereinafter, a "program" will be described as an operation entity in some cases. However, the program is executed by a processor to perform a given process while appropriately using at least one of a storage unit and an interface unit. Therefore, a subject of the process may be considered to be the processor (or a computer or a storage system including the processor). The program may be installed in a computer from a program source. The program source may be, for example, a storage medium which a program distribution server or a computer can read. In the following description, two or more programs may be implemented as one program or one program may be implemented as two or more programs. At least some of the processes implemented by the program may be implanted by a hardware circuit (for example, an application specific integrated circuit (ASIC)) or a field-programmable gate array (FPGA)).

First Embodiment

Figure 1:
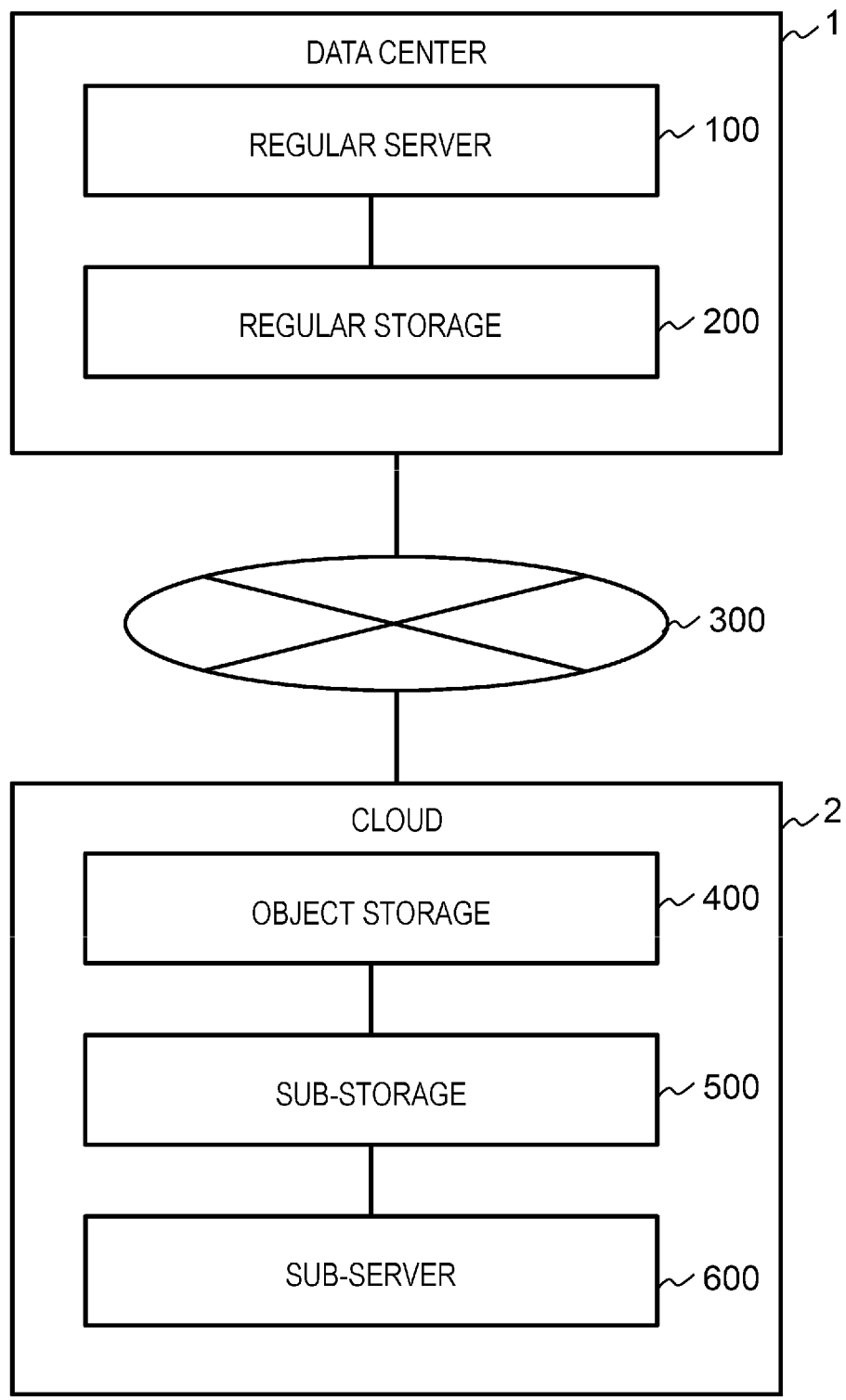
FIG. 1 is a diagram illustrating a storage system according to a first embodiment of the present disclosure.

FIG. 1 is a diagram illustrating a storage system according to a first embodiment of the present disclosure. The storage system illustrated in FIG. 1 includes a data center (an on-premise) 1 that includes a regular server 100 and a regular storage 200 and a cloud 2 that includes an object storage 400, a sub-storage 500, and a sub-server 600. The data center 1 and the cloud 2 are connected to be able to communicate with each other via a network 300. The number of configurations may be plural.

The data center 1 functions as a regular site (a regular environment) that performs a business process in a normal state. The cloud 2 stores backup data of data related to the business process of the data center 1 and functions as a sub-site (a sub-environment) that takes over a business process of the regular server 100 in a specific state such as the time of a disaster.

The regular server 100 is a first host that executes a computer program for performing a business process such as an application program and middleware (hereinafter referred to as an application program) to perform the business process. The regular storage 200 is a first storage apparatus that stores data to be used and generated for a business process by the regular server 100 and stores data in response to an I/O request (a read/write request) from the regular server 100.

The object storage 400 is a storage apparatus that stores backup data of data stored in the regular storage 200. In the embodiment, the backup data is used as recovery data for recovering data in a sub-site and the object storage 400 functions as a recovery storage apparatus that stores the recovery data. The object storage 400 may be a low-cost storage apparatus compared with the regular storage 200 and the sub-storage 500 and is, in the embodiment, an object storage apparatus that is considered to be generally inexpensive and stores data in units of objects. The sub-storage 500 is a second storage apparatus that stores data to be used and generated for a business process by the sub-server 600. The sub-server 600 is a second host that executes an application program to perform a business process. In the embodiment, an example in which a recovery storage apparatus is an object storage will be described. However, a storage other than the object storage may be used as long as the storage is a low-cost storage than the sub-storage including a storage server 503 and a cloud storage 507 illustrated in FIG. 3. The recovery storage apparatus may be a file storage or the like. The recovery storage apparatus may be a storage server provided by a storage vender or on a public cloud.

The sub-server 600 and the sub-storage 500 configure a sub-site that takes over a business process by the regular server 100, for example, when an incident such as a state where the regular server 100 cannot be used due to a disaster or the like occurs. Here, the business process in the sub-site may be a process different from the business process by the regular server 100 (for example, a data analysis process, a development business process, a test business process, or the like).

Figure 2:
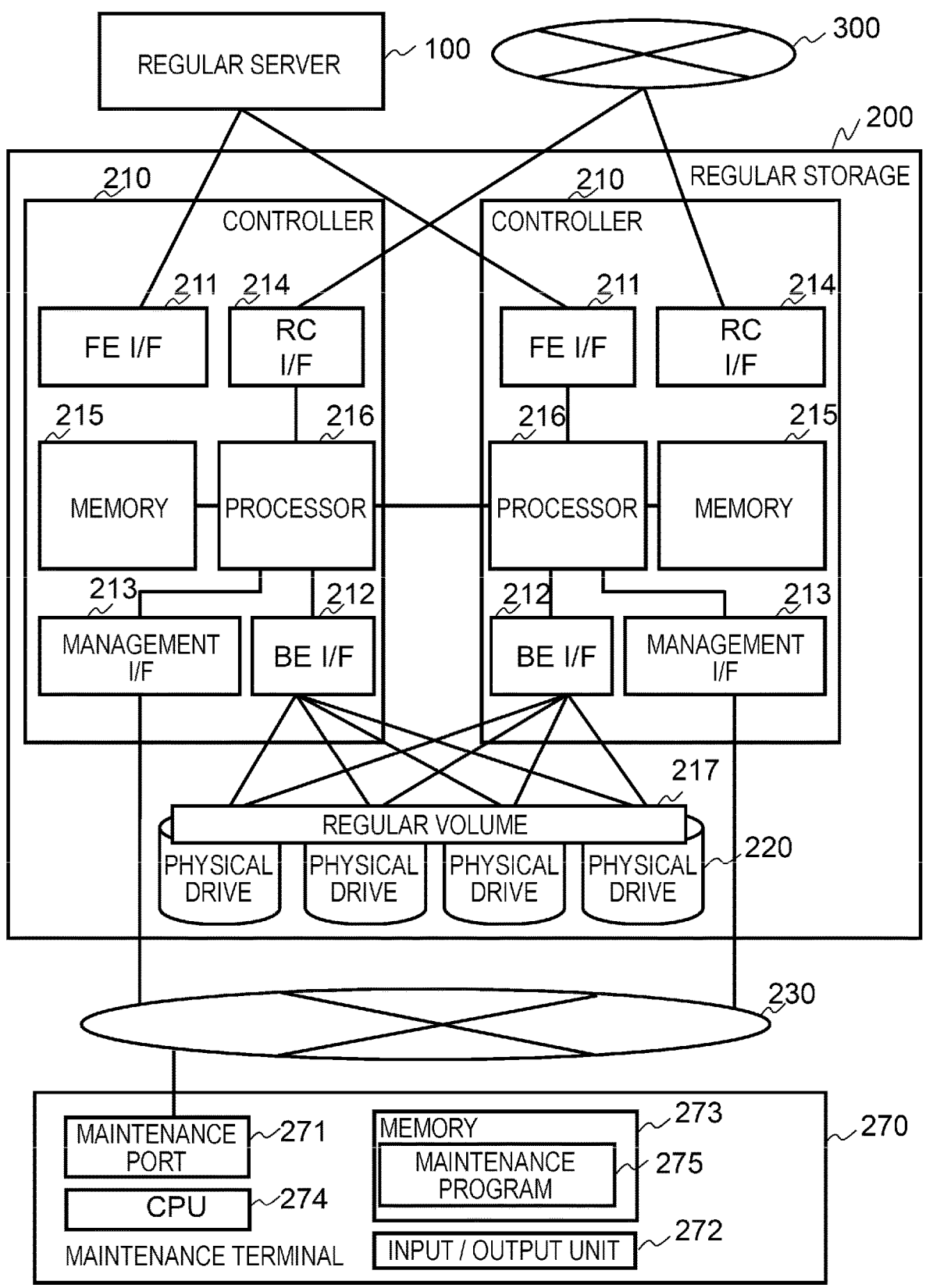
FIG. 2 is a diagram illustrating an exemplary configuration of a regular storage.

FIG. 2 is a diagram illustrating an exemplary configuration of the regular storage 200 and a maintenance terminal 270 connected to the regular storage 200. As illustrated in FIG. 2, the regular storage 200 includes one or more controllers 210 and one or more physical drives 220. FIG. 2 illustrates two controllers 210 and four physical drives 220.

The controller 210 is a control unit that performs control of an I/O request from the regular server 100, control of reading and writing of data from and on the physical drive 220, control of a process of transferring data to a cloud, and the like. The controller 210 includes a front-end (FE) I/F 211, a back-end (BE) I/F 212, a management I/F 213, a remote copy (RC) I/F 214, a memory 215, and a processor 216.

The FE I/F 211 is an interface for communicable connection with the regular server 100 and includes a plurality of fibre channel ports in the embodiment. Here, the FE I/F 211 may include iSCSI ports or the like instead of the fibre channel ports.

The BE I/F 212 is an interface for communicable connection with the physical drive 220. The management I/F 213 is an interface for communicable communication with the maintenance terminal 270 via a management network 230. The RC I/F 214 is an interface for communicable connection with the object storage 400 of the cloud 2 via the network 300. The RC I/F 214 includes, for example, a plurality of Internet protocol (IP) ports. The FE I/F 211 and the BE I/F 212 may share one I/F board.

The memory 215 records a program that defines an operation of the processor 216 and control information or the like used for the program. The memory 215 can store data to be stored in the physical drive 220 as a cache. The processor 216 performs various processes by executing a program recorded on the memory 215.

The physical drive 220 is a physical data storage apparatus that stores data. The plurality of drives 220 may configure a group of one or more redundant array of independent (or inexpensive) disks (RAIDs). A regular volume 217 is configured across a plurality of physical drives 220 and is supplied to the regular server 100.

The maintenance terminal 270 is a terminal for performing maintenance and management of the regular storage 200 and includes a maintenance port 271, an input/output unit 272, a memory 273, and a CPU 274. The maintenance port 271 is connected to be able to communicate with the regular storage 200 via the management network 230. The input/output unit 272 has an input function of receiving various types of information from a user using the maintenance terminal 270 and an output function of outputting various types of information to the user. The memory 273 stores a maintenance program 275 that defines an operation of the CPU 274. The CPU 274 performs various processes for maintenance and management of the regular storage 200 by reading the maintenance program 275 recorded on the memory 273 and executing the read maintenance program 275.

The configuration of the regular storage 200 illustrated in FIG. 2 is merely exemplary and the present disclosure is not limited thereto. For example, the regular storage 200 may be a software defined storage (SDS) that implements a storage function using a program of performing a storage process in each of a plurality of servers.

Figure 3:
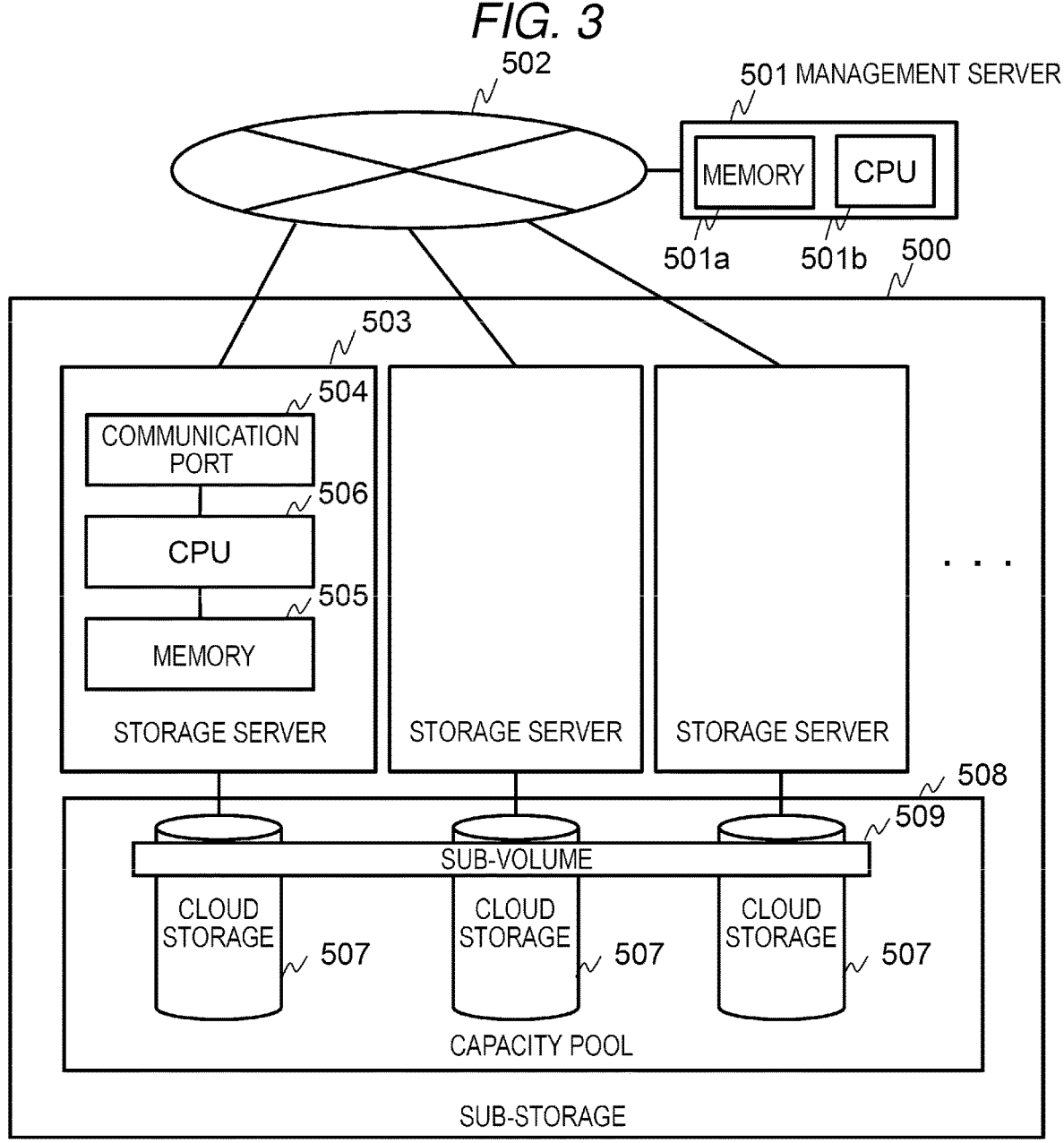
FIG. 3 is a diagram illustrating an exemplary configuration of a sub-storage.

FIG. 3 is a diagram illustrating an exemplary configuration of the sub-storage 500. The sub-storage 500 illustrated in FIG. 3 is constructed in an SDS operating on a public cloud. Here, the sub-storage 500 may have hardware that performs a specific process or the like. Examples of such a type of hardware include hardware for compressing data and hardware for encrypting data.

As illustrated in FIG. 3, the sub-storage 500 is connected to be able to communicate with a management server 501 via a management network 502. The sub-storage 500 includes a plurality of storage servers 503 and a plurality of cloud storages 507 configuring a capacity pool 508.

The storage server 503 is configured by a physical server, a virtual machine, a container, or the like. The storage server 503 includes a communication port 504, a memory 505, and a CPU 506. The communication port 504 is connected to be able to communicate with the management server 501 via the network 502. The communication port 504 is connected to be able to communicate with the cloud storage 507 and the sub-server 600.

The memory 505 records a program that defines an operation of the CPU 506 and control information or the like used for the program. The CPU 506 is a processor that performs various processes by reading a program recorded on the memory 505 and executing the read program. In the embodiment, a function of the storage is implemented by causing the CPU 506 of each storage to execute a program. For example, the CPU 506 receives an I/O request from the sub-server 600 and performs writing and reading of data on and from the cloud storage 507 in response to the I/O request.

The cloud storage 507 is a storage region of the storage server 503. A storage region may be generated using a storage service of a public cloud and may be mounted as the cloud storage 507 on the storage server 503. A sub-volume 509 may be configured across a plurality of cloud storages 507 and may be supplied to the sub-server 600. Data written on the volume may be redundant between the plurality of cloud storages 507. A redundant method is not particularly limited. For example, there is a method of using duplexing of data or a method of using erasure coding.

The configuration of the sub-storage 500 illustrated in FIG. 3 is merely exemplary and the present disclosure is not limited thereto. For example, the sub-storage 500 may be configured as in the regular storage 200. Each storage server 503 may be provided across a plurality of regions (data centers, divisions for guaranteeing availability, divisions (tenants or the like) logically partitioned for each use or user) which can be independently worked or operated. The sub-storage 500 and the sub-server 600 may be provided across a plurality of regions (data centers, divisions for guaranteeing availability, divisions (tenants or the like) logically partitioned for each use or user). The sub-storage 500 and the sub-server 600 may be provided on different clouds or may be located on a cloud service provided by another vender on a public cloud vender.

The management server 501 is a management apparatus that performs management and maintenance of the sub-storage 500. Management for data copy from the regular storage 200, as will be described below, or a failover process, a failback process, and the like are performed. The management server 501 may perform management of the regular storage or may perform management of the regular server 100 or the sub-server 600. The management server 501 includes a memory 501a and a CPU 501b. The memory 501a records a program that defines an operation of the CPU 501b and various types of information or the like used for the program. The CPU 501b is a processor that reads a program recorded on the memory 501a, executes the read program, and performs various processes. A function of the management server 501 may be implemented with any storage server 503.

The storage system according to the embodiment performs a business process in the data center 1 and performs a backup process of storing backup data of data related to the business process in the cloud 2 in a normal state. When a specific state such as the time of a disaster occurs, the storage system performs a failover process of performing the business process in the cloud 2. Thereafter, when the state turns to a normal state, the storage system performs a failback process of returning execution of the business process to the data center 1.

First, the backup process will be described.

Figure 4:
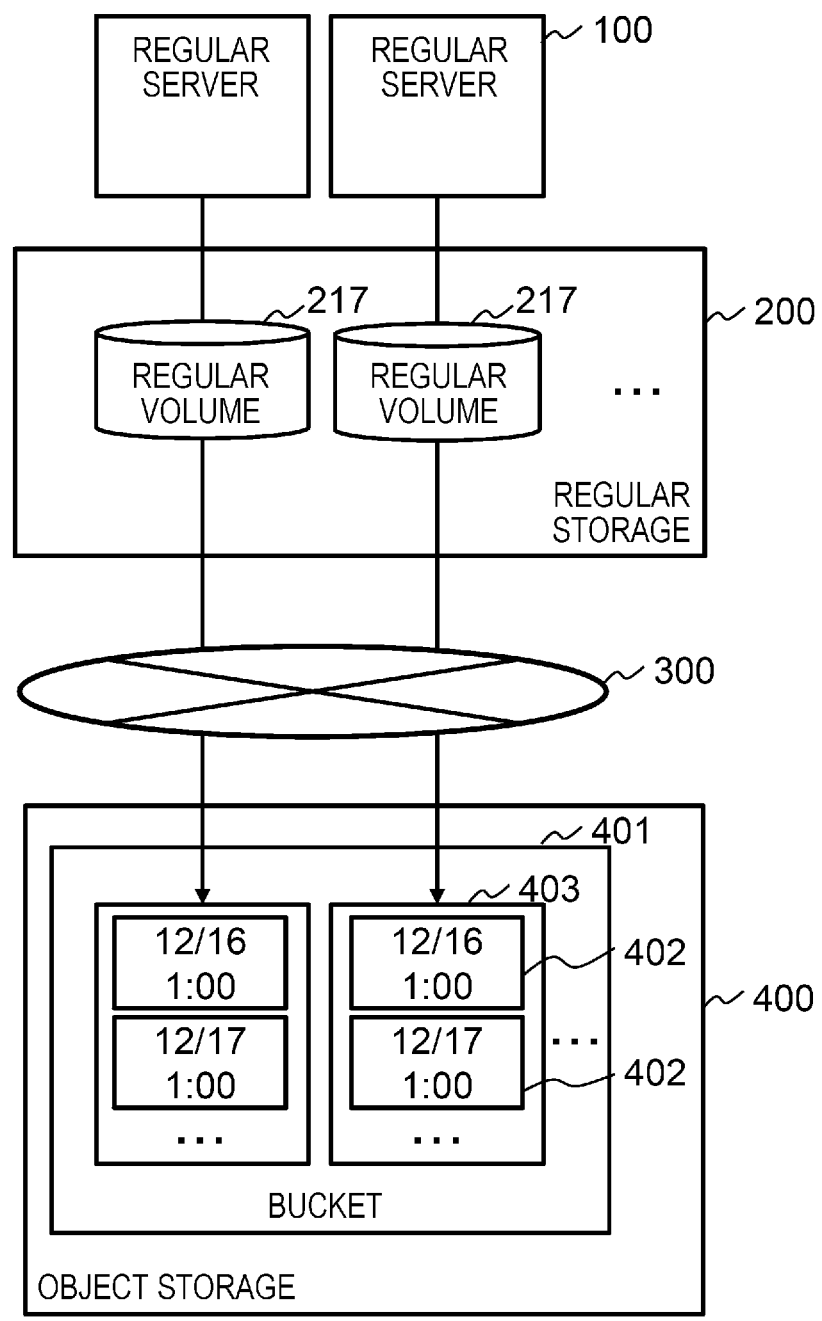
FIG. 4 is a diagram illustrating an overview of a backup process.

FIG. 4 is a diagram illustrating an overview of the backup process. The backup process is a process performed on the regular volume 217 of the protection subject in the regular storage 200 and is a process of storing backup data of data stored in the regular volume 217 of the protection subject in the object storage 400. The regular volume 217 of the protection subject is designated, for example, as a protection subject such as a user.

In the object storage 400, a bucket 401 which is a storage region used to protect the regular volume 217 is set. In the bucket 401, backup data transferred from the regular storage 200 is stored as an object 402. In an example of FIG. 4, one object 402 is configured for each piece of backup data. An object 402 in which backup data transferred at 1:00 on 16 December (12/16 1:00) is stored and an object 402 in which backup data transferred at 1:00 on 17 December (12/17 1:00) is stored are illustrated. Here, when there is an upper limit in an object size which is a data size which can be stored as one object 402 or when a parallel process is performed on the backup data, one piece of backup data may be stored in the plurality of objects 402. The backup data may be divided into the plurality of objects 402 from the viewpoint of performance or the like or the size of the backup data may be determined based on a specification of an object storage.

In FIG. 4, for each regular volume 217, an object group 403 formed by the objects 402 in which the backup data of the regular volume 217 is stored is illustrated. However, the object group 403 is indicated for convenience and is not managed as an entity in a storage system.

Figure 5:
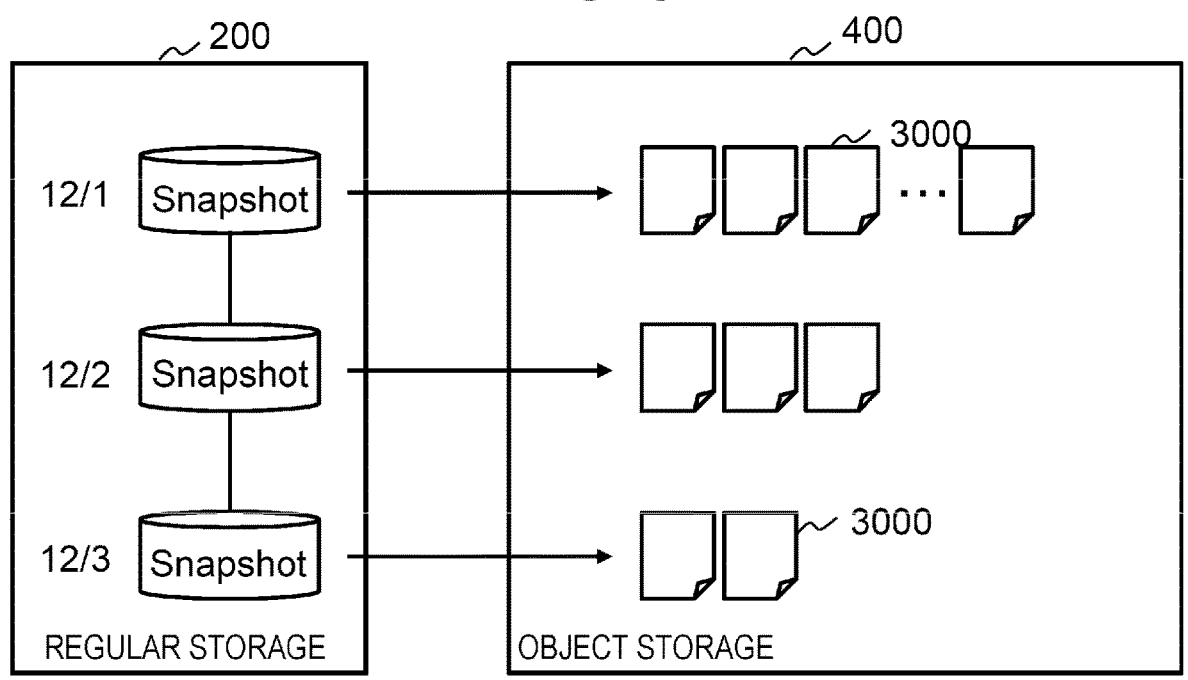
FIG. 5 is a diagram illustrating an example of a method of transferring backup data.

FIG. 5 is a diagram illustrating an example of a method of transferring backup data.

There are a plurality of transfer methods of transferring the backup data to the object storage 400. For example, examples of the transfer methods include incremental backup, difference backup, and remote copy. The incremental backup and the difference backup are methods of transferring backup data periodically. The incremental backup is a method of transferring update data updated after the time of previous transfer of backup data as subsequent backup data. The difference backup is a method of transferring difference data of initially transferred backup data as backup data. The remote copy is a method of reflecting update of the regular volume 217 in the object storage 400. In the remote copy, there are a method of transferring data in sequence when the data is written on the regular volume 217 and a method of collectively transferring written data periodically. In the method of transferring data periodically, only finally updated data may be transferred when the data is updated for the same address a plurality of times. In the embodiment, a transfer method is the incremental backup.

In the incremental backup, a snapshot of data stored in the regular storage 200 (more specifically, data stored in the regular volume 217 of the protection subject among data stored in the regular storage 200) is generated periodically (in the example of FIG. 5, daily) and is transferred to the object storage 400.

For example, at a time of 1 December which is an initial transfer timing, data stored in the regular storage 200 is transferred and stored as objects 3000 in the object storage 400. In general, a ratio of the number of regular volumes 217 to the number of objects 3000 is 1:N (which is an integer of 2 or more), but may be 1:1 or the like.

At a time of 2 December which is a subsequent transfer timing, a snapshot of only difference data generated between 1 December and 2 December is retained and the snapshot is transferred and stored in the object storage 400. Similarly, at a time of 3 December which is a further subsequent transfer timing, a snapshot of only difference data generated between 2 December and 3 December is retained and the snapshot is transferred and stored in the object storage 400.

A generation frequency at which the snapshot is generated and a transmission frequency at which the snapshot is transferred to the object storage 400 may be different from each other. For example, a snapshot which is not referred to for a given period in the regular storage 200 may be transferred to the object storage 400. Transfer of the same data as data stored in the object storage 400 may be avoided. In this case, management information indicating the same data may be transferred instead of performing transfer of the data. In this case, an amount of data to be transferred and an amount of data stored in the object storage 400 can be reduced.

Figure 6:
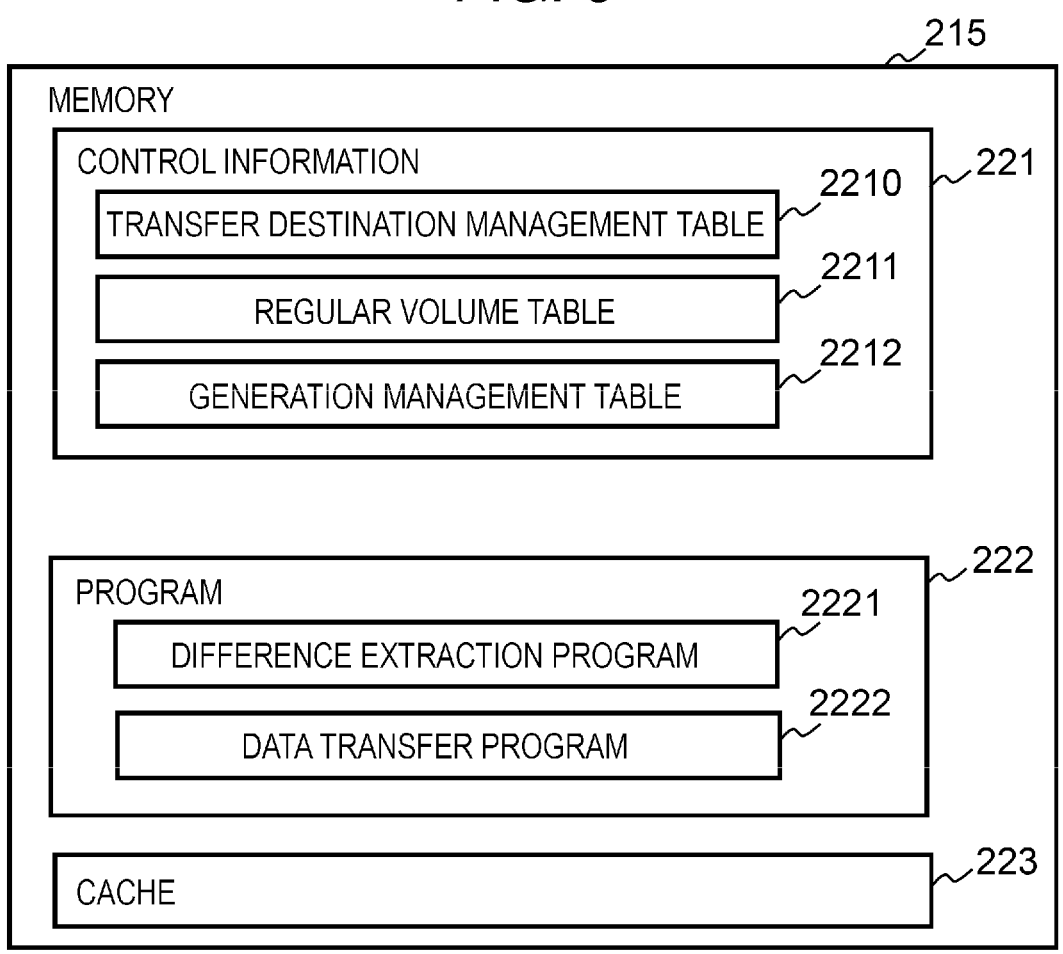
FIG. 6 is a diagram illustrating an example of information stored in a memory of the regular storage.

FIG. 6 is a diagram illustrating an example of information stored in a memory 215 of the regular storage 200. As illustrated in FIG. 6, the memory 215 stores a program 222 and control information 221 as information related to a backup process. The memory 215 includes a cache unit 223 that temporarily stores data.

The control information 221 includes a transfer destination management table 2210, a regular volume table 2211, and a generation management table 2212. The transfer destination management table 2210 is information for managing a transfer destination of backup data and indicates the object storage 400 of the transfer destination and a bucket. The regular volume table 2211 is information for managing the regular volume 217 of the protection subject and a bucket that stores data of that regular volume. The generation management table 2212 is information for managing the regular volume 217 and a generation number of the snapshot in the regular volume 217. The generation number is a number indicating a generation sequence of the snapshot with respect to the regular volume 217. The generation number is not limited to a table and may be managed in another format such as a bitmap.

The program 222 includes a difference extraction program 2221 and a data transfer program 2222. The difference extraction program 2221 is a program for generating a snapshot and the data transfer program 2222 is a program for transferring the snapshot generated in the difference extraction program 2221 to the object storage 400.

Figure 7:
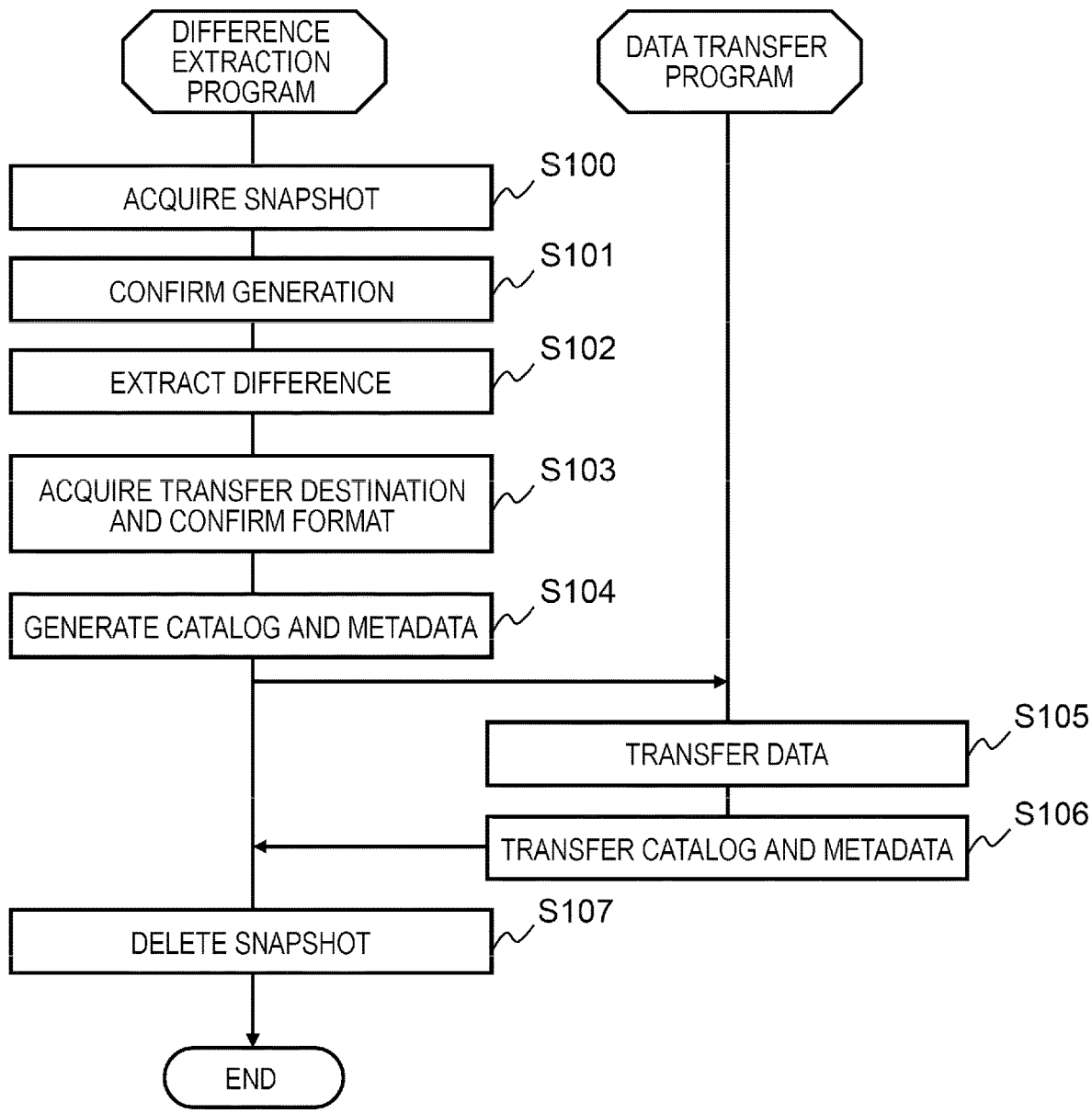
FIG. 7 is a flowchart illustrating an example of the backup process.

FIG. 7 is a flowchart illustrating an example of a backup process.

In the backup process, at a timing at which a snapshot is acquired, the difference extraction program 2221 acquires the snapshot of the regular volume 217 as a present snapshot for each regular volume 217 of the protection subject (step S100).

The difference extraction program 2221 confirms a generation number of the present snapshot acquired in step S100 (step S101). For example, when the generation number is a serial number, the difference extraction program 2221 confirms the present generation number by increasing the previous generation number.

The difference extraction program 2221 extracts a difference between the previous snapshot and the present snapshot (step S102). The extraction of the difference can be implemented by retaining a writing address of the data written on the regular volume 217 after the acquisition of the snapshot or comparing snapshot metadata between the previous and present snapshots. The snapshot metadata is information indicating an address at which snapshot data is physically stored. When data of a protection subject volume is the same, capacity consumption by the snapshot can be reduced by storing an address indicating a physical position at which the data of the protection subject volume is stored.

The difference extraction program 2221 specifies the bucket of the cloud 2 of the transmission destination of the backup data which is a difference in the snapshot with reference to the transfer destination management table 2210 and further confirms a format which is a transfer method for the data (step S103). For example, the difference extraction program 2221 determines which data is collected as one object in accordance with an upper limit of an object size as the format.

The difference extraction program 2221 generates a catalog which is management information for managing a backup process and metadata for managing the backup data (step S104). More detailed description of the catalog and the metadata will be described below with reference to FIG. 8.

Thereafter, the data transfer program 2222 transfers the backup data as objects to the object storage 400 of the cloud 2 in accordance with the format confirmed in step S103 (step S105). At this time, the data transfer program 2222 may appropriately perform a process related to the transfer of the backup data, such as a process of assigning headers of the objects.

The data transfer program 2222 transfers the catalog and the metadata generated in step S104 (step S106). For example, the data transfer program 2222 may transfer the catalog and the metadata as the objects to the object storage 400 or may transfer the catalog and the metadata to another storage unit such as a database on the cloud 2. Information may be stored in an object key of the object. For example, when a protection subject volume number or the like is an object key name, it is not necessary to store the protection subject volume number in the object.

Then, the difference extraction program 2221 deletes the previous snapshot inside the regular storage 200 (step S107) and ends the process. The present snapshot is not deleted since the present snapshot is used in step S101 of the subsequent backup process.

It is not necessary to delete all the snapshots until the previous time. When the snapshot remains in the regular storage 200, a capacity consumed in the regular storage 200 becomes large, but a time necessary to restore the data can be reduced. For example, when the snapshot acquired at 11:00 is restored from the cloud 2 and there is the snapshot at time 9:00 in the regular storage 200, a difference from 9:00 to 11:00 may be acquired from the cloud 2. On the other hand, when there is the snapshot at 10:00 in the regular storage, only a difference from 10:00 to 11:00 may be acquired from the cloud 2, and a transfer amount of the data can be reduced and a time necessary to restore the data can be reduced. The process of transferring the data of the regular storage 200 has been described using the example in which the program stored in the memory 215 is executed. However, the RC I/F 214 may become an entity and data stored in the regular volume may be transferred to the cloud 2. In this case, the transfer destination management table 2210, the regular volume table 2211, the generation management table 2212, and the data transfer program 2222 are stored in a memory in the RC I/F. Sharing other than the role sharing can also be considered, but the invention can be applied regardless of such a scheme.

Figure 8:
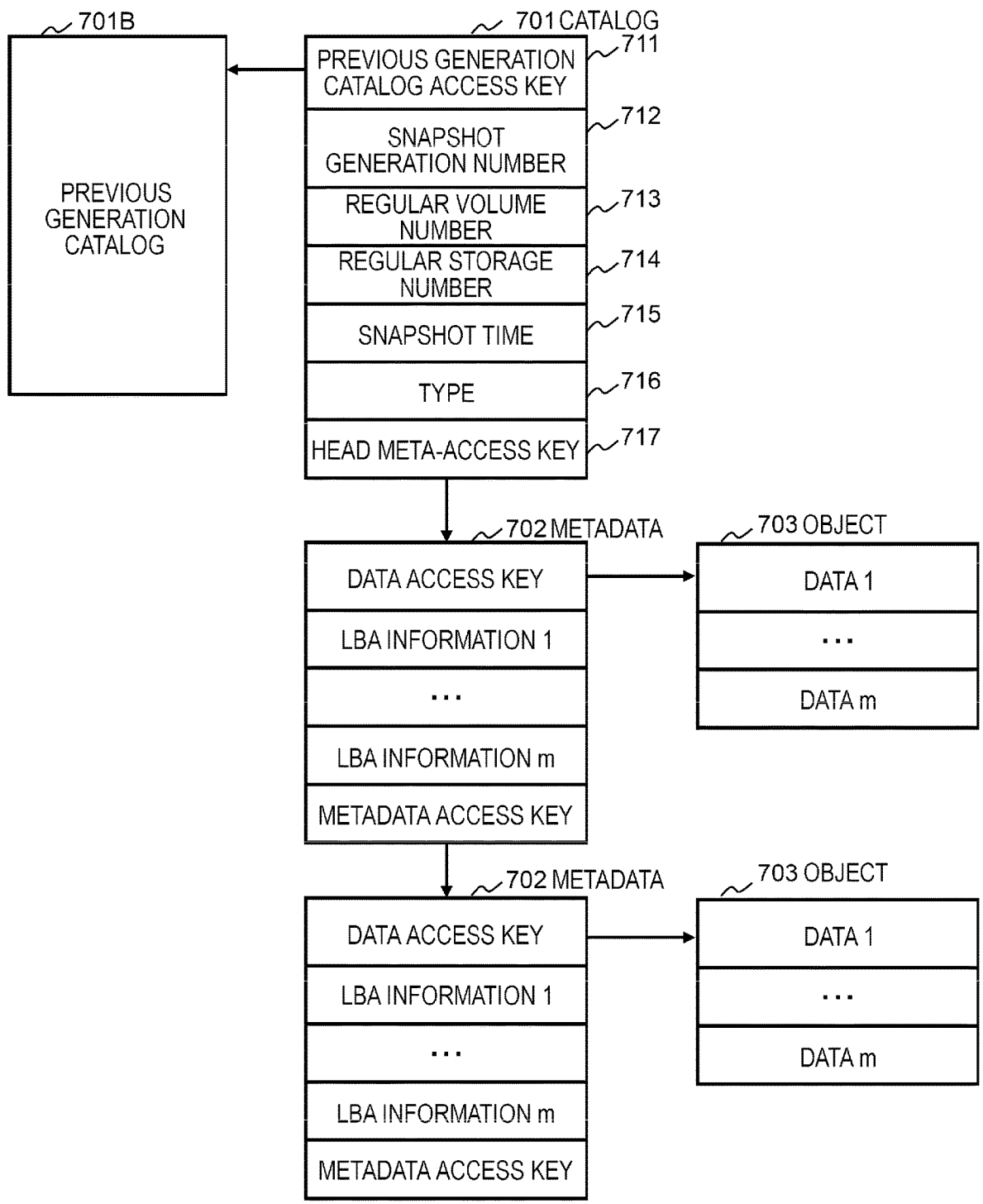
FIG. 8 is a diagram illustrating an example of a catalog and metadata.

FIG. 8 is a diagram illustrating an example of a catalog and metadata.

A catalog 701 illustrated in FIG. 8 includes a previous generation catalog access key 711, a snapshot generation number 712, a regular volume number 713, a regular storage number 714, a snapshot time 715, a type 716, and a head meta-access key 717.

The previous generation catalog access key 711 is key information for specifying a previous generation catalog 701B which is a catalog related to the previous snapshot. The snapshot generation number is a generation number of the present snapshot. The regular volume number 713 is an identification number for identifying the regular volume 217 of the protection subject. The regular storage number 714 is an identification number for identifying a storage apparatus that has the regular volume 217 of the protection subject. The snapshot time 715 is a time at which the present snapshot is acquired. The type 716 is a type of backup process and indicates, for example, any of "full backup", "incremental backup", and "difference backup".

The head meta-access key 717 is key information for specifying the metadata 702 for managing the data transferred as the backup data. The metadata 702 is generated for each object and the head meta-access key 717 specifies any metadata 702. In the initial backup process, all the data stored in the regular volume 217 of the protection subject are transferred. At this time, the metadata 702 may not be present. In this case, a value of the head meta-access key is null.

The catalog 701 is normally generated for each regular volume 217, but the plurality of regular volumes 217 may be collectively managed.

The metadata 702 includes a data access key 721, logical block addressing (LBA) information 722, and a metadata access key 723.

The data access key 721 is key information for accessing data included in the object 703. The LBA information 722 indicates an address (LBA) on the regular volume of the data stored in the object 703. The LBA information 722 is present for each piece of data stored in the object 703. The metadata access key 723 is an access key for identifying the subsequent metadata 702. A value of the metadata access key 723 in the final metadata 702 is null.

The object 703 stores a data body. In the example of FIG. 8, m pieces of data are stored in one object 703. A size of each piece of data included in the object 703 is assumed to be a fixed length. In accordance with a method of keeping data size information in the metadata 702, the object 703 can store variable-length data.

Next, a failover process will be described.

A sub-environment of the sub-storage 500 and the sub-server 600 is used when a disaster or the like occurs. Therefore, in a normal state, it is preferable to inhibit charging of the sub-environment from the viewpoint of a cost. In the embodiment, the sub-storage 500 configuring the sub-environment includes the storage servers 503 and the cloud storages 507, as illustrated in FIG. 3. The storage server 503 performing a storage-related process is constructed in a virtual machine of the cloud 2. The cloud storage supplying a capacity is constructed by a storage service supplied by the cloud 2. The sub-server 600 is constructed in a virtual machine of the cloud 2. Since the virtual machine is charged in accordance with a powered-on time (a started state), the virtual machine is powered off. Since the cloud storage 507 is charged in accordance with a capacity, the sub-storage 500 is set to an initial state in which a capacity (a storage capacity) is a predetermined minimum value (a minimum capacity). The sub-storage 500 is used only when a state in which the failover process is performed and a business process is performed in the sub-environment. Therefore, the capacity of the sub-storage 500 is not problematic when the capacity is a minimum value. The minimum value of the capacity is set, for example, in a vender providing the cloud 2. The minimum value of the capacity may be zero. Even when a charging subject is not a virtual machine or the cloud storage 507 but the sub-storage 500, the charging can be minimized similarly by turning power off or minimizing the capacity.

FIG. 9 is a diagram illustrating an example of a failover process.

As illustrated in FIG. 9, in a state A which is a normal state, the sub-server 600 is powered off, the storage server 503 included in the sub-storage 500 is powered off, and thus a capacity allocated to the cloud storage 507 included in the sub-storage 500 is set to a minimum value. In the state A, as described with reference to FIGS. 4 to 8, backup data of the data stored in the regular storage 200 is appropriately stored in the object storage 400.

When an incident such as a disaster occurs, the sub-server 600 is powered on, the storage server 503 included in the sub-storage 500 is powered on, a capacity of the cloud storage 507 is further added and registered to a capacity pool. Thus, the storage system transitions to a state B which is a specific state in which a business process can be performed in the sub-environment.

Figure 10:
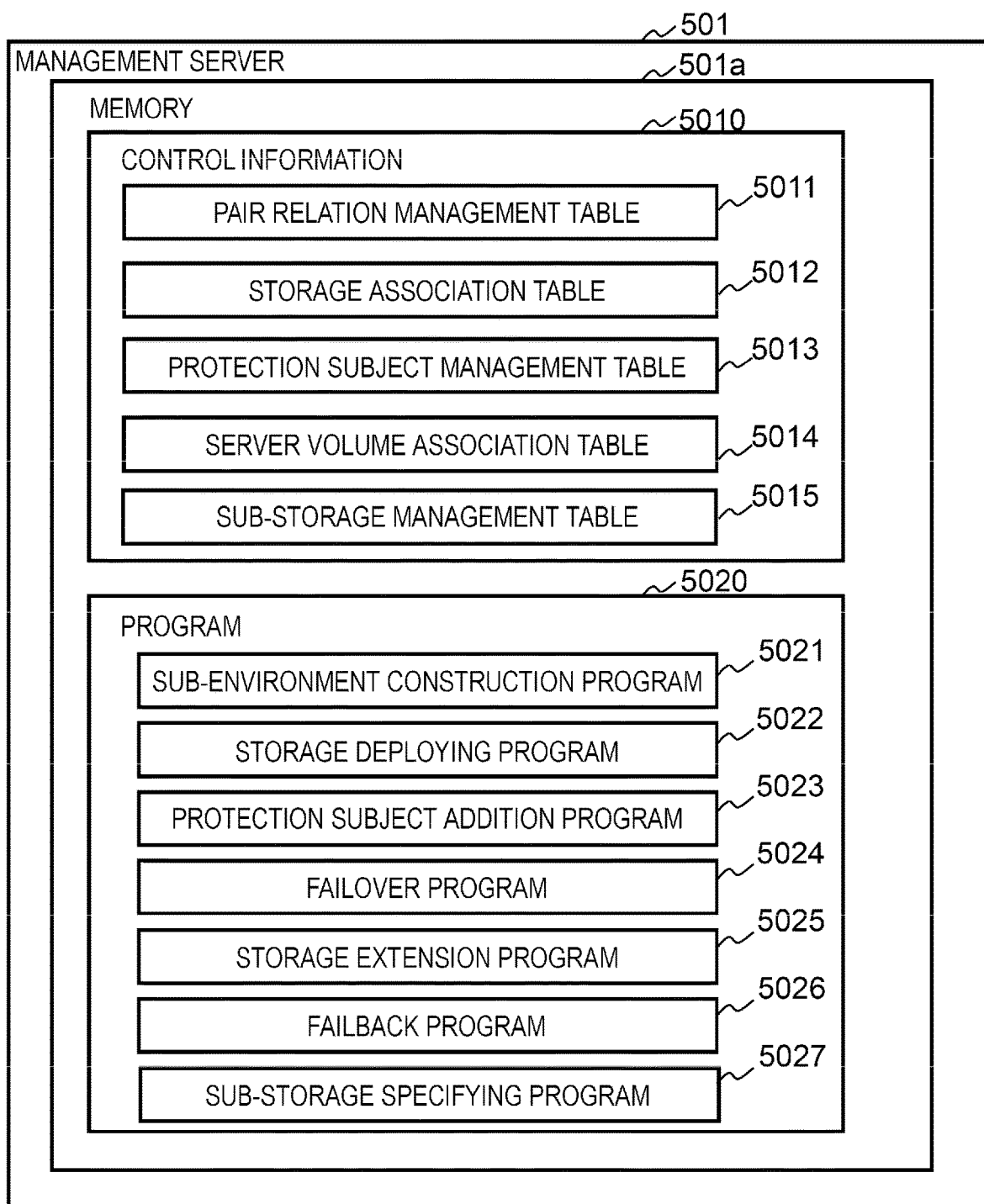
FIG. 10 is a diagram illustrating an example of information stored in a management server of the sub-storage.

FIG. 10 is a diagram illustrating an example of information stored in the memory 501a of the management server 501 of the sub-storage 500. As illustrated in FIG. 10, the memory 501a stores control information 5010 and a program 5020 as information related to the failover process and the failback process.

The control information 5010 is information for designating the sub-storage 500 recovering data in order to execute a business process in a sub-site. Specifically, the control information 5010 includes a pair relation management table 5011, a storage association table 5012, a protection subject management table 5013, a server volume association table 5014, and a sub-storage management table 5015. The protection subject management table 5013, the server volume association table 5014, and the sub-storage management table 5015 are used in a second embodiment.

The program 5020 includes a sub-environment construction program 5021, a storage deploying program 5022, a protection subject addition program 5023, a failover program 5024, a storage extension program 5025, a failback program 5026, and a sub-storage specifying program 5027. The sub-storage specifying program 5027 is used in the second embodiment.

Figure 11:
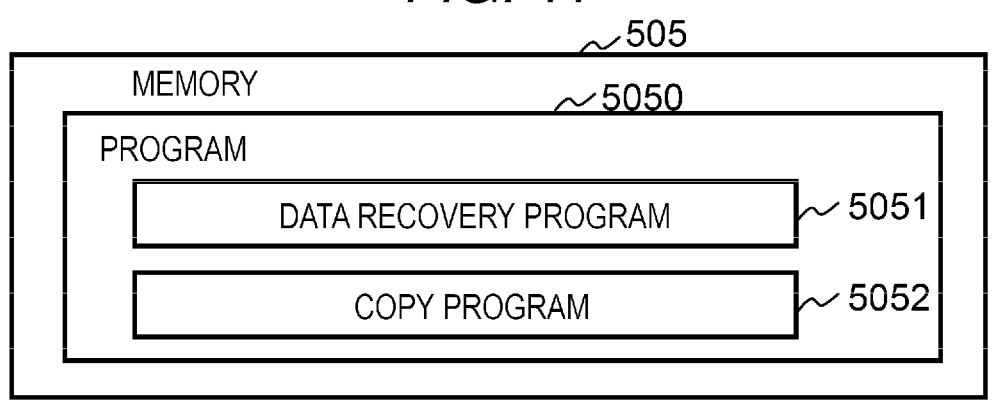
FIG. 11 is a diagram illustrating an example of information stored in a storage server of the sub-storage.

FIG. 11 is a diagram illustrating an example of a program stored in the memory 505 of the storage server 503 of the sub-storage 500. As illustrated in FIG. 11, the memory 505 includes a data recovery program 5051 and a copy program 5052 as a program 5050 related to the failover process and the failback process.

FIG. 12 is a diagram illustrating examples of the pair relation management table 5011 and the storage association table 5012.

In FIG. 12, the pair relation management table 5011 is information for managing an association relation between the regular volume 217 and the sub-volume 509 and includes fields 801 to 805.

In the field 801, a regular storage number for identifying the regular storage 200 including the regular volume 217 of the protection subject is stored. In the field 802, a regular volume number for identifying the regular volume 217 of the protection subject is stored. In the field 803, a sub-storage number for identifying the sub-storage 500 of a recovery destination in which the regular volume 217 of the protection subject is recovered is stored. In the field 804, a sub-volume number for identifying the sub-volume 509 of the recovery destination in which the regular volume 217 of the protection subject is recovered is stored. In the field 805, an object bucket number for identifying a bucket storing data to be recovered in the object storage 400 is stored.

An example of FIG. 12 shows that data of a regular volume "1" in a regular storage "1-1" is recovered to a volume "1" of a sub-storage "2-1." The data to be recovered is stored in a bucket "A" of the object storage 400. Unlike a disaster recovery of the related art, according to the present disclosure, a recovery destination of the regular volume "1" is the volume "1" of the sub-storage "2-1," but the data of the regular volume "1" is copied to the bucket "A" of the object storage 400 without being copied to the volume "1" of the sub-storage "2-1."

The storage association table 5012 is storage association information for managing an association relation between the regular storage 200 and the sub-storage 500 and includes fields 811 and 812.

In the field 811, a regular storage number for identifying the regular storage 200 including the regular volume 217 of the protection subject is stored. In the field 812, sub-storage information related to the sub-storage 500 associated with the regular storage 200 including the regular volume 217 of the protection subject is stored. Specifically, the field 812 includes fields 813 to 815. In the field 813, the number of storage servers which is the number of storage servers 503 included in the sub-storage 500 is stored. In the field 814, an instance type which is a type of the storage server 503 is stored. In the field 815, a capacity of the storage server 503 is stored.

The cloud 2 may be notified of an operational record (the number of I/O, a capacity, and the like) of the regular storage 200 to calculate a necessary scale of the sub-storages from the operation record. In this case, only the operational record may be stored in the pair relation management table 5011. Not only the operation record but also the number of nodes, the instance type, the capacity, and the like may be stored. The operational record may be generated in units of regular storages, as described above, but may be generated in units of volumes or units of failover groups. In general, necessary resources at the time of being necessary as characteristics of the cloud can be added in some cases. Therefore, resources may be added to the storage 500 in accordance with a load on the sub-storage 500 after failover. In this case, the storage association table 5012 is not necessary.

Figure 13:
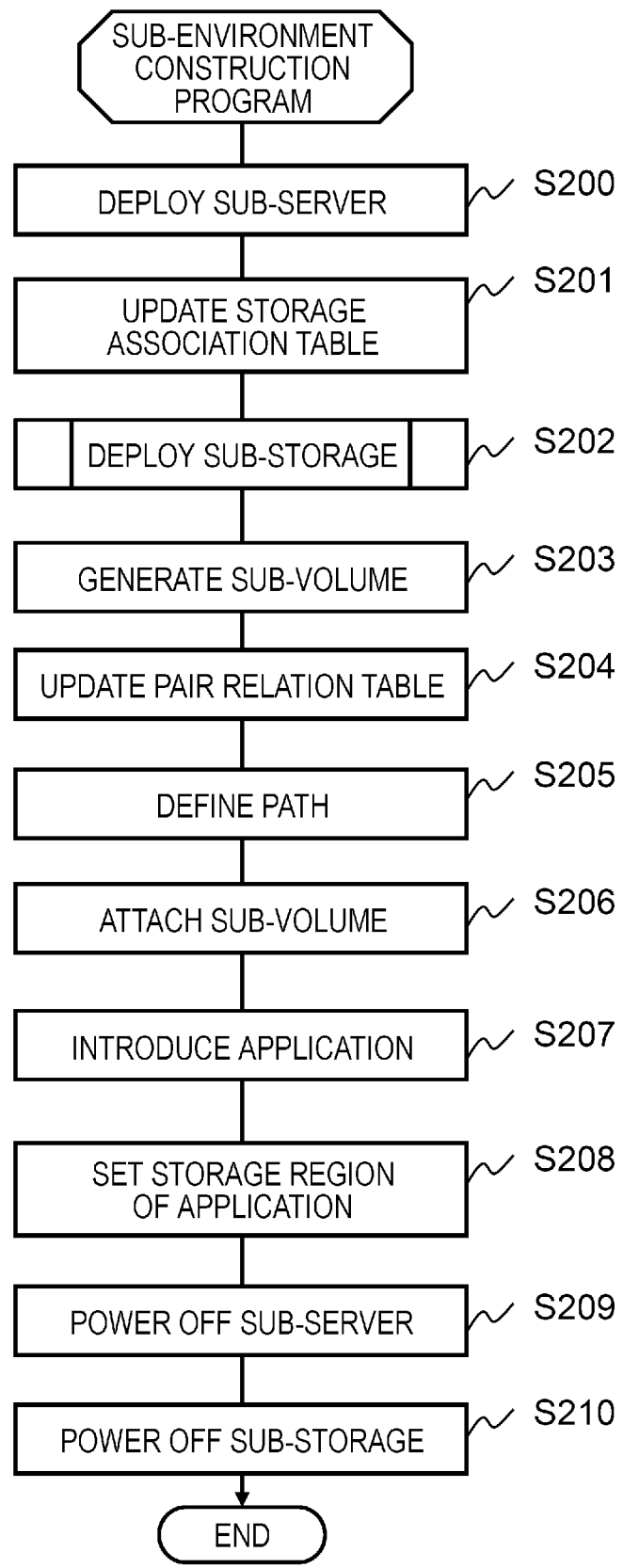
FIG. 13 is a flowchart illustrating an example of a sub-environment construction process.

FIG. 13 is a flowchart illustrating an example of a sub-environment construction process of constructing a sub-environment. The sub-environment construction process is a preparation process of performing the failover process at the time of occurrence of an incident and is performed in the sub-environment construction program 5021.

The sub-environment construction program 5021 is assumed to receive regular volume information (for example, a regular storage number, a regular volume number, a regular server number, and the like) related to the regular volume 217 of the protection subject from the regular server 100 and the like.

First, the sub-environment construction program 5021 deploys the sub-server 600 based on the received regular volume information (step S200). Then, the sub-environment construction program 5021 generates the storage association table 5012 (step S201). For example, the sub-environment construction program 5021 generates the storage association table 5012, for example, by acquiring the operational record (the number of I/O, a capacity, and the like) of the regular storage and calculating the scale of the sub-storage 500. In this case, in the storage association table 5012, only the operational record may be stored as sub-storage information or the operational record may be added.

Thereafter, the sub-environment construction program 5021 calls the storage deploying program 5022 and performs a sub-storage deploying process (see FIG. 14) for deploying the sub-storage 500 (step S202). At this time, the sub-environment construction program 5021 designates a capacity of the capacity pool to a minimum value and calls the storage deploying program 5022.

Then, the sub-environment construction program 5021 generates the sub-volume 509 (step S203) and further generates the pair relation management table 5011 (step S204). At this time, the sub-environment construction program 5021 deploys the numbers of necessary sub-storages 500 and sub-servers 600 based on the received regular volume information. The sub-environment construction program 5021 generates the sub-volume 509 in the sub-storage 500 so that a relation between the sub-storage 500 and the sub-volume 509 is similar to a relation between the regular storage 200 and the regular volume 217.

The sub-environment construction program 5021 defines a relation between a port and a volume as a path (step S205). The sub-environment construction program 5021 allocates the sub-volume 509 to the sub-storage 500 so that the relation is the same as the relation between the regular volume 217 and the regular server 100 (step S206). The sub-environment construction program 5021 introduces an application program into the sub-server 600 (step S207) and sets a storage region of the application program (step S208).

Then, the sub-environment construction program 5021 powers off the sub-server 600 (step S209), further powers off the sub-storage 500 (step S210), and ends the process.

Figure 14:
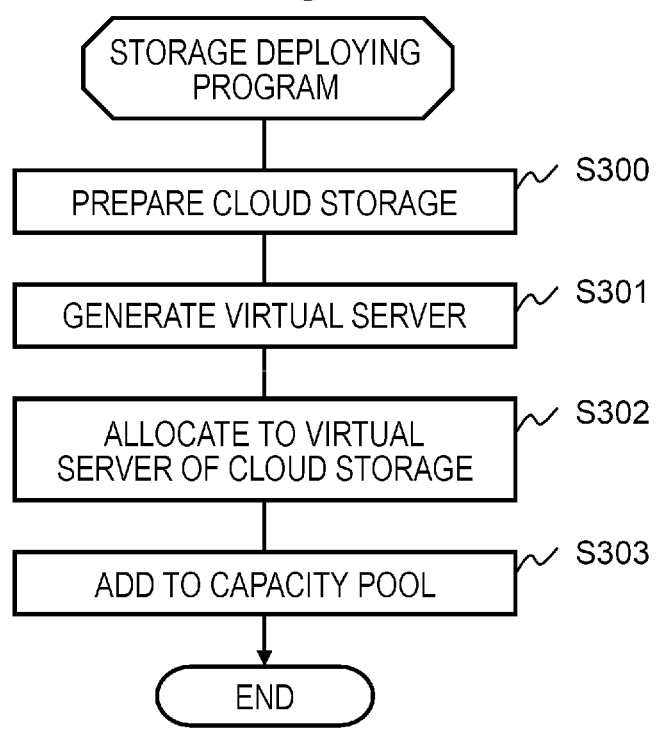
FIG. 14 is a flowchart illustrating an example of a sub-storage deploying process.

FIG. 14 is a flowchart illustrating an example of the sub-storage deploying process of step S202 of FIG. 13. The deploying of the sub-server may be implemented by copying the regular server to the sub-server. For example, the deploying can be implemented using a function or a service of copying a virtual machine from an on-premise to a cloud.

In the sub-storage deploying process, the storage deploying program 5022 prepares the cloud storage 507 (step S300). Then, the storage deploying program 5022 generates a virtual server for the storage server 503 (step S301). The storage deploying program 5022 allocates the cloud storage 507 to the virtual server (step S302). The storage deploying program 5022 adds the capacity of the cloud storage 507 to a storage capacity pool (step S303) and ends the process.

In the sub-storage deploying process, information such as the number of storage servers 503, the instance type, and the capacity necessary to configure the sub-storage 500 is updated. Such information may be received from a manager or the like. The capacity of the storage server 503 may be determined based on the capacity of the regular volume. Since the same content as that of the storage association table 5012 can be received from the outside, the storage association table 5012 may not be stored.

Figure 15:
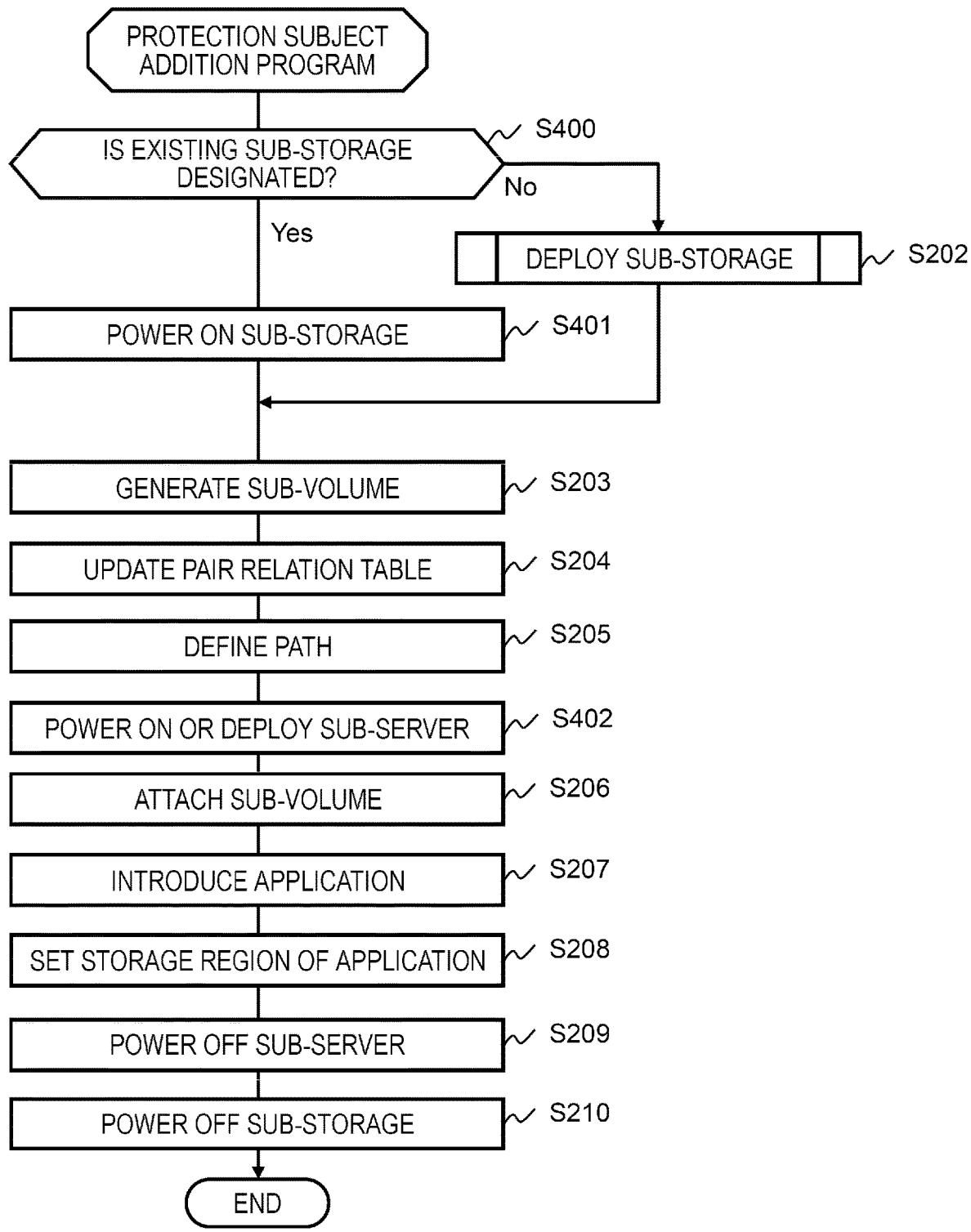
FIG. 15 is a flowchart illustrating an example of a protection subject addition process.

FIG. 15 is a flowchart illustrating an example of a protection subject addition process of adding the regular volume 217 of the protection subject. The protection subject addition process is performed in the protection subject addition program 5023.

The protection subject addition program 5023 determines whether the existing sub-storage 500 is designated as the sub-volume 509 recovering the added regular volume 217 (step S400). When the existing sub-storage 500 is designated, the protection subject addition program 5023 powers on the existing sub-storage 500 (step S401). At this time, the protection subject addition program 5023 may power on only some of the sub-storages 500. For example, when the sub-storage 500 corresponding to the regular volume is fixed, only the sub-storage server may be powered on. Conversely, when the existing sub-storage 500 is not designated, the sub-storage deploying process of step S202 described above is performed.

Thereafter, the processes of steps S203 to S210 described with reference to FIG. 13 are performed. Here, the protection subject addition program 5023 performs the following process between the processes of steps S205 and S206 (step S402). That is, the protection subject addition program 5023 powers on the sub-server 600 when the deployed sub-server 600 access the sub-volume (the sub-volume 509 recovering the regular volume 217 to be added). The protection subject addition program 5023 deploys the sub-server 600 when the undeployed sub-server 600 accesses the sub-volume.

Figure 16:
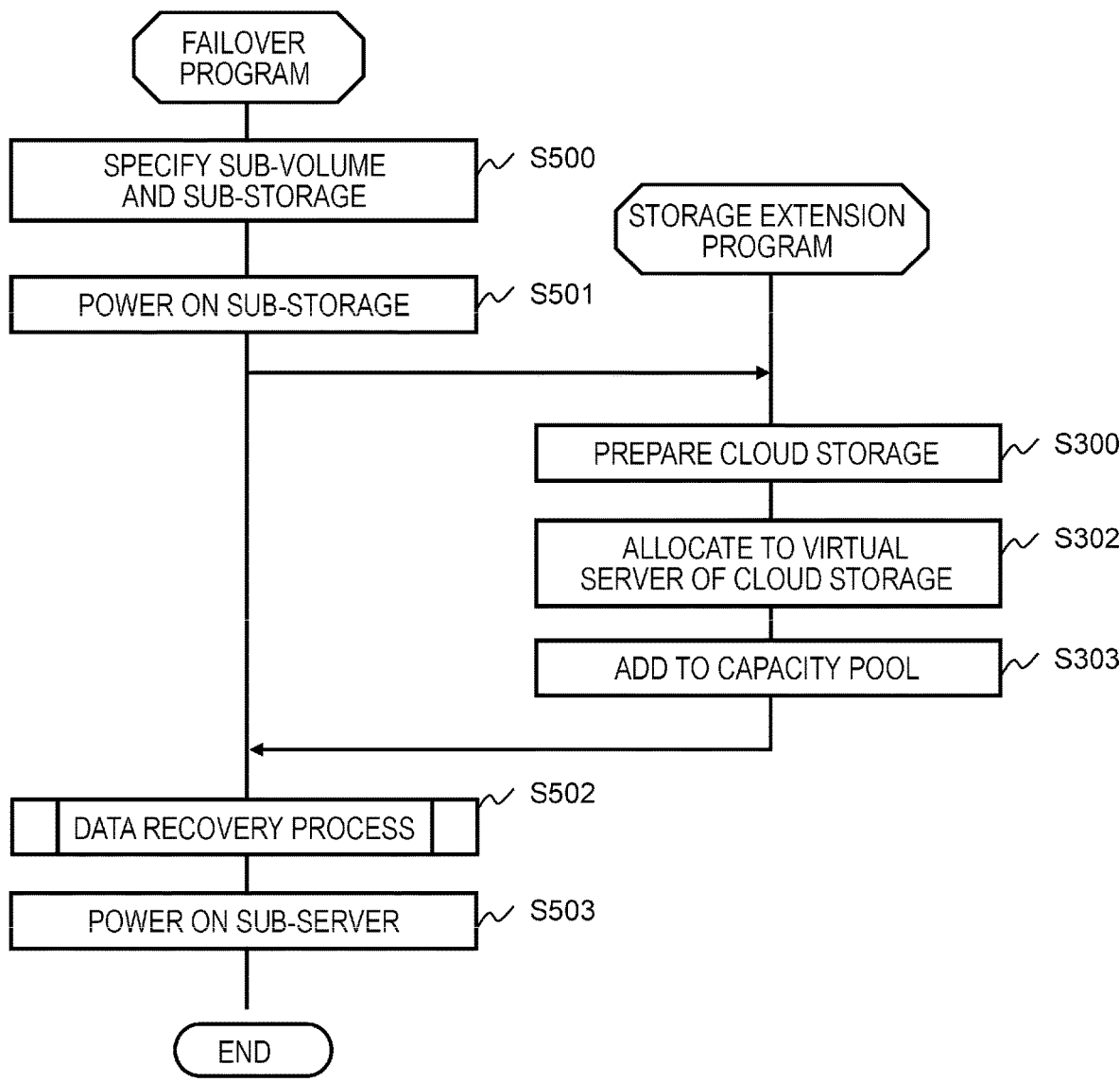
FIG. 16 is a diagram illustrating an example of a failover process.

FIG. 16 is a flowchart illustrating an example of a failover process. The failover process is performed in the failover program 5024 and the storage extension program 5025 of the management server 501. The failover process is performed, for example, when an execution instruction is given from a superior such as a person or a failure detection program.

In the failover process, the failover program 5024 first specifies the sub-storage 500 and the sub-volume 509 which are failover destinations of the regular volume 217 of the protection subject based on the pair relation management table 5011 (step S500). In a case in which the sub-volume 509 and the regular volume 217 of the protection subject normally have one-to-one association relation, there is a case in which the process of step S500 is omitted.

Subsequently, the failover program 5024 powers on the specified sub-storage 500 (step S501).

Thereafter, the storage extension program 5025 performs the same processes as the processes of steps S300, S302, and S303 described with reference to FIG. 11. here, in the process of step S303, the capacity of the capacity pool is the minimum value at the present time. Therefore, the storage extension program 5025 adds the capacity of the capacity pool based on the storage association table 5012. For example, the storage extension program 5025 adds the capacity of the capacity pool by generating the cloud storage 507 using the cloud service and allocating the generated cloud storage 507 to the storage server 503 that has been powered on.

Thereafter, the failover program 5024 performs a data recovery process (see FIG. 17) of recovering the data stored in the bucket in the object storage 400 to the sub-volume (step S502). Then, the failover program 5024 powers on the sub-server (step S503) and ends the process.

In the failover process, other processes such as a process of starting an application program and a process of taking over an IP address may be appropriately performed in addition to the process described in each step of FIG. 14. In the example of FIG. 14, the example of the failover process of a disaster recovery system has been described, but another business process in which data stored in the object 402 is used may be performed in a sub-site. The other business process is, for example, an analysis process of analyzing data, a development process of performing various developments using data, a test process of performing various tests using data, or the like. In this case, each program of performing the failover process may be replaced with a program of performing start of another business process. This point is similar in the second embodiment or the like.

Figure 17:
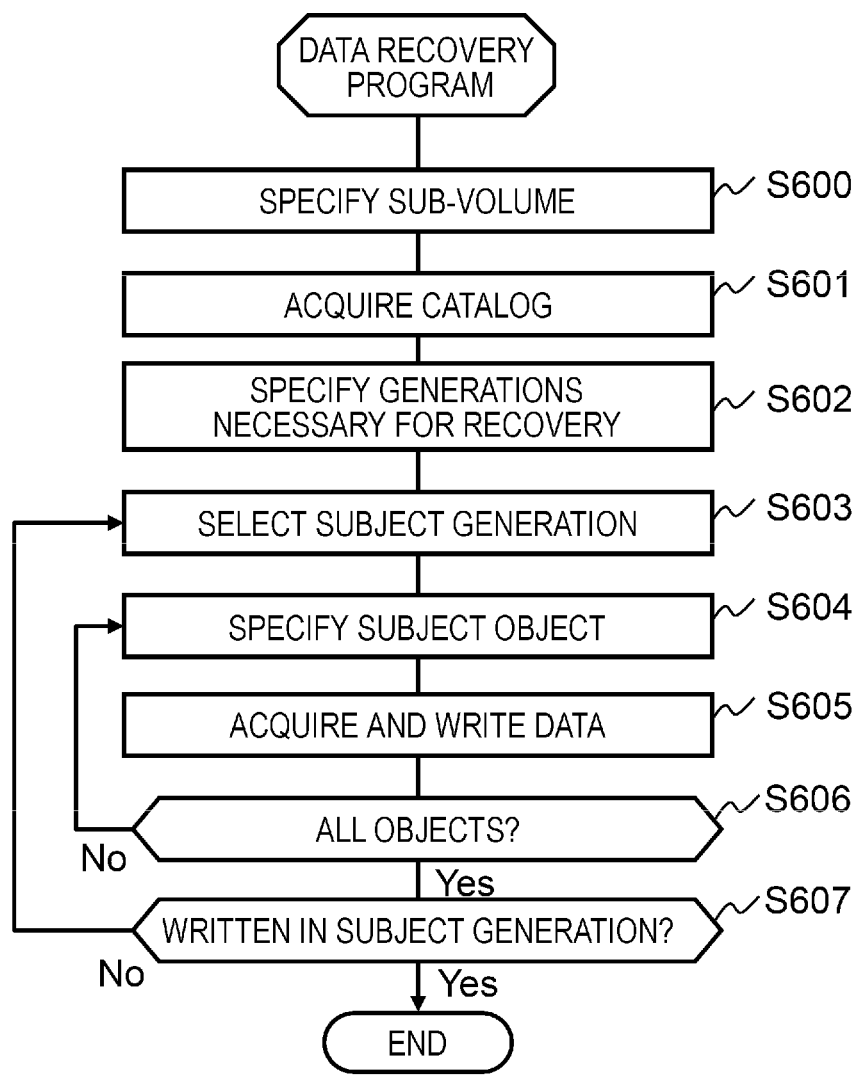
FIG. 17 is a flowchart illustrating an example of a data recovery process.

FIG. 17 is a flowchart illustrating an example of the data recovery process of step S502 of FIG. 16. The data recovery process is performed by the data recovery program 5051. In the embodiment, the data is stored in the object storage 400 in the incremental backup.

In the data recovery process, the data recovery program 5051 specifies the sub-volume 509 recovering data (step S600). When there are the plurality of sub-volumes 509, the subsequent processes are performed for each sub-volume 509.

The data recovery program 5051 acquires a catalog of the data to be recovered (step S601). An access key for accessing the catalog may be separately managed or may be specified from the regular volume 217 of the recovery subject. For example, "regular volume number+generation number" corresponding to the regular volume of the recovery subject may be managed as the access key.

The data recovery program 5051 specifies all the generations of a snapshot necessary to recover the data as necessary generations (step S602).

The data recovery program 5051 selects any of the necessary generations as a subject generation (step S603).

The data recovery program 5051 selects any subject data object which is an object storing the snapshot of the subject generation based on the metadata 702 corresponding to the catalog 701 of the subject generation (step S604). The data recovery program 5051 reads the data from the subject data object and stores the data in the sub-volume 509 that has an LBA in accordance with the LAB information of the metadata 702 (step S605). The data recovery program 5051 determines whether all the subject data objects are selected (step S606).

When all the subject data objects are not selected (No in step S606), the data recovery program 5051 returns the process to step S604. Conversely, when all the subject data objects are selected (Yes in step S606), the data recovery program 5051 checks whether all the data of the subject generation is recovered to the sub-volume (step S607).

When all the data is not recovered (No in step S607), the data recovery program 5051 returns the process to step S604. When all the data is recovered (Yes in step S607), the process ends.

The plurality of data recovery processes may be performed in parallel by performing the plurality of data recovery programs 5051 in parallel. The data recovery programs 5051 may be performed by the storage server 503 or may be dynamically allocated by other servers performing the data recovery programs 5051. At a data recovery request time, the number of other servers may be determined. A calculation service (for example, a server-less service) or the like of a public cloud may be utilized as the data recovery program 5051.

Next, a failback process will be described.

Figure 18:
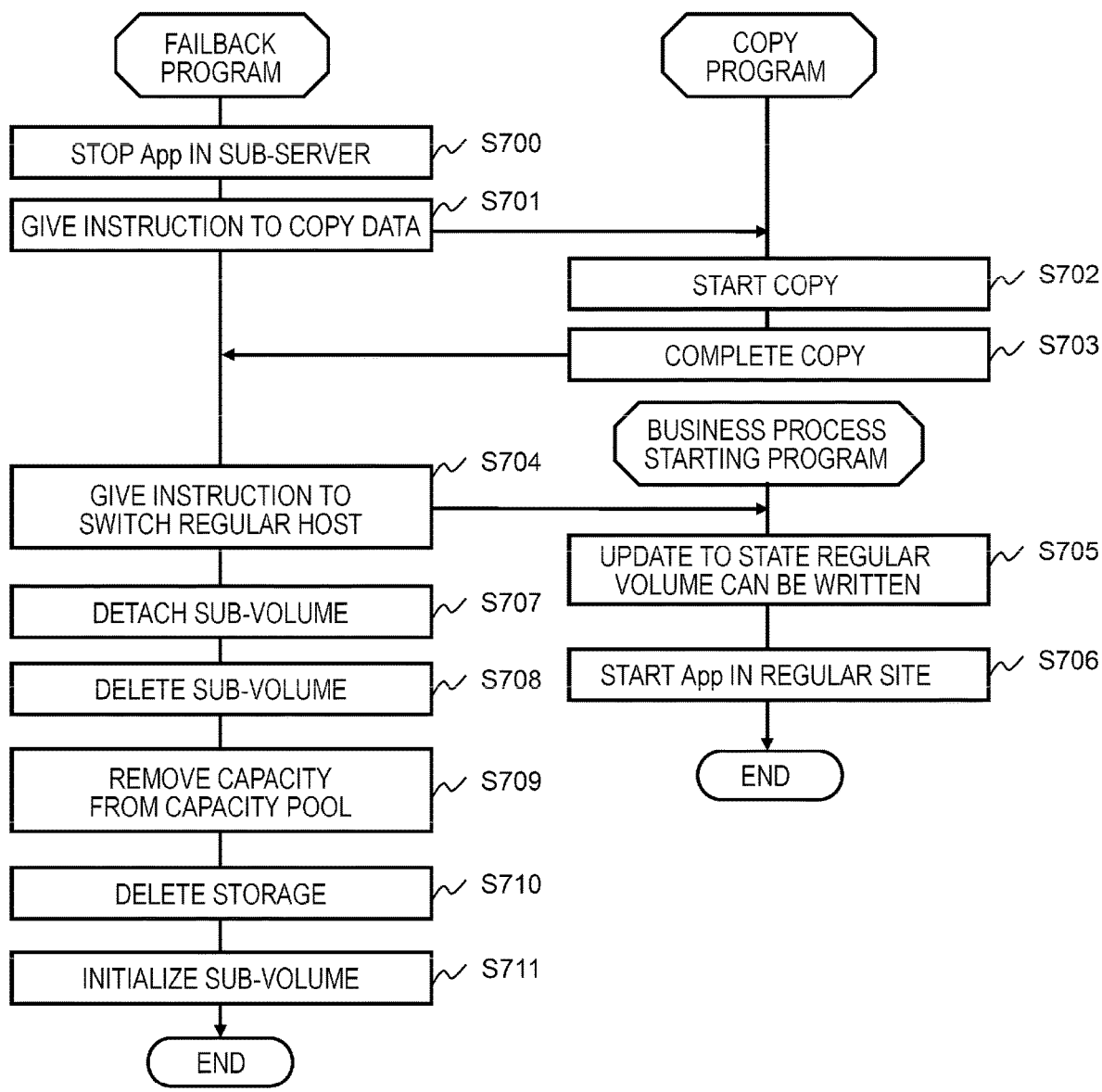
FIG. 18 is a flowchart illustrating an example of a failback process.

FIG. 18 is a flowchart illustrating an example of the failback process. The failback process is performed in the failback program 5026, the copy program 5052, or a business process starting program. The business process starting program is a program operating as management software in the data center 1 and executes start of an application program, a change in a state of the regular storage 200, or the like. The business process starting program is not illustrated.

In the failback process, the failback program 5026 first stops an application program of the sub-server 600 (step S700). The failback program 5026 instructs the regular storage 200 to copy data (step S701).

When the foregoing instruction is received, the copy program 5052 of the regular storage 200 starts copying the data from the sub-volume 509 recovering the data to the regular volume 217 corresponding to the sub-volume 509 (step S702). Thereafter, when the copying of the data ends, the copy program 5052 notifies the failback program 5026 that the copying of the data ends (step S703).

The failback program 5026 instructs the business process starting program to perform switching to a regular host (step S704). When the instruction is received, the business process starting program performs changing to a state in which the regular volume 217 can be written (step S705), further starts the application program of the regular server 100 (step S706), and ends the process.

Conversely, the failback program 5026 detaches the sub-volume from the sub-server 600 (step S707). The failback program 5026 deletes (detaches) the sub-volume (step S708) and removes a capacity corresponding to the deleted sub-volume from the capacity pool (step S709). Then, the failback program 5026 deletes the sub-storage 500 corresponding to the removed capacity from the sub-site (step S710). Accordingly, it is possible to use the cloud service or the like in the sub-environment and inhibit charging.

Thereafter, the failback program 5026 generates another sub-volume 509 (initializes the sub-volume) by performing processes similar to the processes of steps S201 to S210 of FIG. 13 (step S711) and ends the process.

In step S711, the failback program 5026 changes the number of the sub-volume 509 in the pair relation management table 5011 to a sub-volume number for identifying the other sub-volume 509. When the application program is not changed in step S711, a process corresponding to step S207 of introducing the application program can be omitted.

The above-described failback process is merely exemplary and the present disclosure is not limited thereto. For example, in the failback process, the following process can be performed instead of performing the process subsequent to step S708. That is, the failback program 5026 releases the capacity of the sub-volume and removes a capacity corresponding to the released capacity from the capacity pool. Thereafter, the failback program 5026 deletes the sub-storage 500 corresponding to the removed capacity from the sub-site. Then, the failback program 5026 powers off the sub-server 600 and further powers off the sub-storage 500. In this case, since the sub-volume is not deleted, the sub-volume number for identifying the sub-volume is not changed. Therefore, updating of the pair relation management table 5011, definition of a path, and setting of a storage region for an application program can be prevented from being performed again. The releasing the capacity of the sub-volume can be implemented by giving an instruction to release the capacity for the business process starting program and performing a capacity releasing process which is a general technology.

In the failback process described with reference to FIG. 18, the data is copied from the sub-storage 500 to the regular storage 200. However, the data may be moved in accordance with the following method.

Specifically, the failback program 5026 maps the sub-volume 509 of the sub-storage 500 to the regular volume 217 of the regular storage 200. The failback program 5026 supplies the mapped regular volume 217 to the regular host and resumes business in the regular host. Thereafter, the failback program 5026 reads the sub-volume 509 to which the regular storage 200 is mapped and performs writing to the regular volume 217 of a copy destination in the regular storage 200. At this time, by performing the process in the regular volume of the copy destination in a region where the copying is completed and transferring a read/write request to the sub-storage 500 in a region where the copying is not completed, the process is performed in the sub-storage 500. After the copying is completed, the failback program 5026 changes an IC destination of the regular host to the regular volume of the copy destination. There are a plurality of methods in the reading and writing process during the copying, and any method may be used. For example, a method of transferring the data from the sub-storage 500 to the regular storage 200 simultaneously with a read request can be exemplified.

As described above, in the embodiment, the management server 501 stops the sub-server 600 in advance and prepares the sub-storage 500 operating in response to a request from the sub-server 600 at the time of transition at which the business process is performed using data stored in the regular storage 200 in the sub-server 600. The management server 501 recovers and stores the data in the sub-storage 500 by using recovery data stored in the object storage 400 and starts the sub-server 600. Accordingly, since a cost related to an operation of the sub-site earlier than the time of transition can be reduced, an operational cost of the sub-site can be reduced.

In the embodiment, the sub-storage 500 is stopped in a previously deployed state so that the capacity is a minimum value. Therefore, it is possible to perform transition to the sub-site quickly while inhibiting charging in accordance with the capacity of the sub-storage 500.

In the embodiment, the recovery data is stored in the object storage 400. In general, since the object storage 400 is at a low cost, a cost related to storing of the recovery data can be reduced.

In the embodiment, since the sub-storage 500 is prepared using an SDS operating on a public cloud, the sub-storage 500 can be easily prepared.

Since the regular storage 200 generates backup data of the stored data and stores the backup data as recovery data in the object storage 400, it is not necessary to prepare the recovery data separately, and therefore the cost can be further reduced.

In the embodiment, when a business process is returned to a regular site, the sub-server 600 is stopped, the data stored in the sub-storage 500 is copied to the regular storage 200, and the state is returned to a state in which the sub-storage 500 is prepared. Therefore, when the business process ends in the sub-site, an operational cost after that can be reduced.

Second Embodiment

In the first embodiment, in the normal state, the sub-storage 500 is deployed. However, in the present embodiment, the sub-storage 500 is deployed at the time of failover.

FIG. 19 is a diagram illustrating an example of the failover process according to the embodiment.

As illustrated in FIG. 19, in the state A which is the normal state, the object storage 400 is at the same state as that of the first embodiment illustrated in FIG. 9, that is, stores backup data of data stored in the regular storage 200. The sub-server 600 is powered off and the sub-storage 500 is not constructed.

When an incident such as a disaster occurs, the sub-server 600 is powered on and the sub-volume 509 accessed by the sub-storage 500 and the sub-server 600 is generated. The data is recovered from the object storage 400 to the sub-volume 509. In the example of FIG. 19, at the state A, the sub-server 600 may be powered off and the sub-server 600 may not be generated. In this case, the sub-server 600 is generated using transition to the state B as a trigger.

FIG. 20 is a diagram illustrating examples of the protection subject management table 5013 and the server volume association table 5014.

The protection subject management table 5013 illustrated in FIG. 20 includes fields 901 to 905. In the field 901, a regular storage number for identifying the regular storage 200 including the regular volume 217 of the protection subject is stored. In the field 902, a group number indicating a failover group managing units of volumes switched at the time of failover is stored. In the field 903, a regular volume number for identifying the regular volume 217 of the protection subject is stored. In the field 904, a capacity of the regular volume of the protection subject is stored. In the field 905, a bucket information indicating a bucket for storing backup data of the regular volume 217 of the protection subject is stored.

The protection subject management table 5013 is used to specify a bucket in which data is stored when data is recovered to the sub-volume. When a capacity or the like of the regular volume 217 is updated in the regular storage 200, the protection subject management table 5013 is also updated. For example, when the capacity of the regular volume 217 is extended, the regular storage 200 may notify a public cloud of the extension of the capacity and the protection subject management table 5013 may be updated on the public cloud side.

The server volume association table 5014 illustrated in FIG. 20 includes fields 911 to 913.

In the field 911, a regular volume number for identifying the regular volume 217 of the protection subject is stored. In the field 912, regular server information for identifying the regular server 100 to which the regular volume 217 of the protection subject is allocated is stored. One regular volume 217 may be allocated to the plurality of regular servers 100. In the field 913, a sub-server number for identifying the sub-server 600 taking over a business process by the regular server 100 is stored. The sub-server number is confirmed and stored in the server volume association table 5014 when the sub-server 600 is deployed in the sub-environment construction program 5021.

FIG. 21 is a diagram illustrating an example of the sub-storage management table 5015. The sub-storage management table 5015 illustrated in FIG. 21 includes fields 921 to 925.

In the field 921, a sub-storage number is stored. In the field 922, a regular storage number is stored. In the field 923, a failover group number is stored. In the field 924, sharable information indicating whether the sub-storage 500 specified with the sub-storage number can be shared with another failover group is stored. In the field 925, an availability rate of the sub-storage 500 specified with a sub-storage number is stored.

Figure 22:
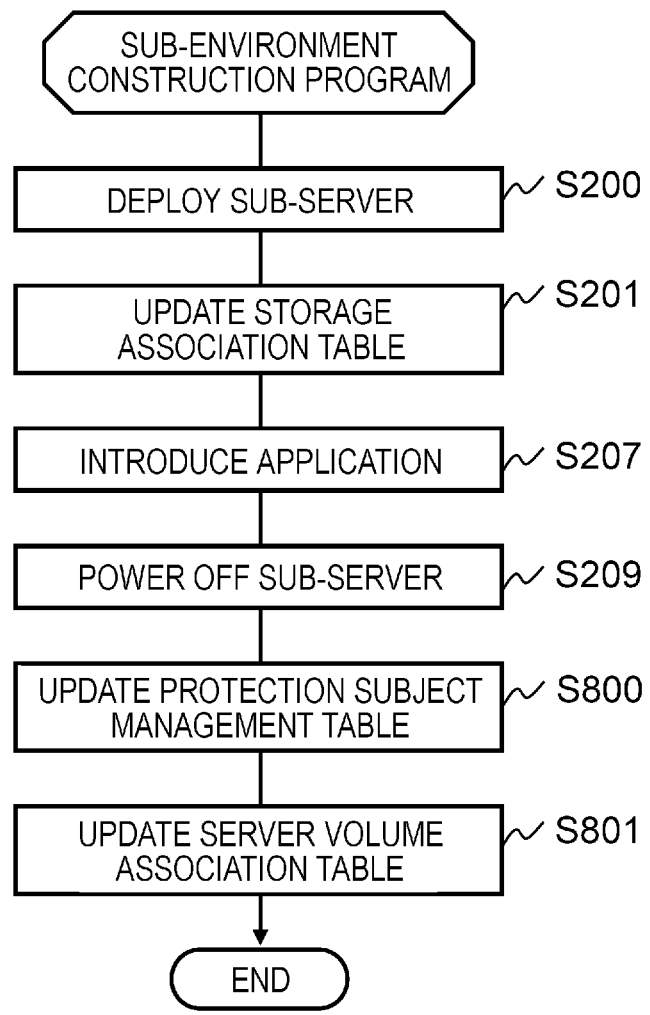
FIG. 22 is a flowchart illustrating another example of the sub-environment construction process.

FIG. 22 is a flowchart illustrating an example of the sub-environment construction process according to the embodiment. In the embodiment, since the sub-storage 500 is not deployed at a preparation stage, some processes of the sub-environment construction process according to the first embodiment described with reference to FIG. 13 are performed.

Specifically, the sub-environment construction program 5021 performs the processes of steps S200, S201, S207, and S209. In the embodiment, since the sub-storage number and the sub-volume number of the storage association table 5012 are confirmed at the time of failover, the sub-environment construction program 5021 may set a regular storage number, a regular volume number, and an object bucket in the process of step S201.

When the process of step S209 ends, the sub-environment construction program 5021 adds information regarding the regular volume 217 set as a protection subject to the protection subject management table 5013 (step S800). Then, the sub-environment construction program 5021 updates the server volume association table 5014, manages a relation between the regular server 100 and the regular volume 217, and the sub-server 600 deployed in step S200 (step S801), and ends the process.

Figure 23:
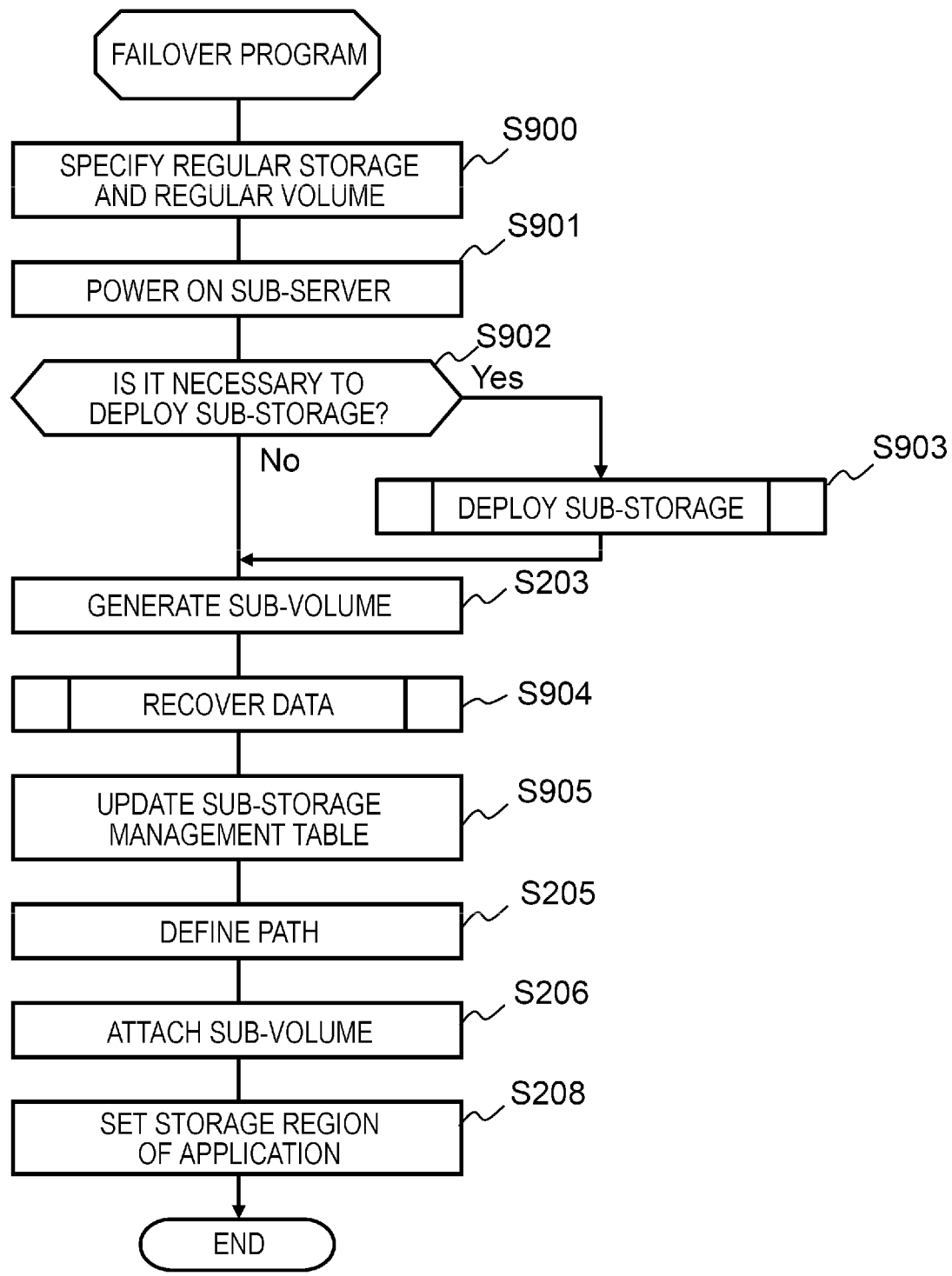
FIG. 23 is a flowchart illustrating another example of the failover process.

FIG. 23 is a flowchart illustrating an example of the failover process according to the embodiment.

In the failover process, the failover program 5024 first specifies the regular volume 217 which is a failover subject and the regular storage 200 to which the regular volume 217 is allocated (step S900). For example, at the time of failover, the regular volume 217 or a failover group which is a failover subject is designated. Based on the designation, the failover program 5024 can acquire the regular storage number of the regular storage 200 to which the regular volume 217 is allocated from the protection subject management table 5013.

The failover program 5024 specifies the sub-server 6000 to be started based on the sub-server number corresponding to the regular volume number of the regular volume 217 which is a failover subject by using the server volume association table 5014 (step S901). The sub-server 600 may be deployed at this timing and an application may be introduced.

The failover program 5024 calls the sub-storage specifying program 5027 and determines whether it is necessary to deploy the sub-storage 500 corresponding to the specified sub-server 600 using the sub-storage management table 5015 with regard to the sub-storage specifying program 5027 (step S902). When there are a plurality of failover groups in the regular storage 200, the sub-storage 500 which is a subject of this process is likely to be already deployed in the failover process of the other failover groups. Therefore, this process is performed.

When the deploying is necessary (Yes in step S902), the failover program 5024 deploys the sub-storage 500 (step S903). At this time, the failover program 5024 determines deployment content of the sub-storage 500 (the number of servers included in the sub-storage 500, a capacity of the sub-storage, and the like) by retrieving the storage association table 5012 with the regular storage number. Conversely, when the deploying is not necessary (No in step S902), the process of step S903 is skipped.

Thereafter, the failover program 5024 generates the sub-volume 509 (step S203) and performs a data recovery process of recovering data stored in the bucket inside the object storage 400 to the sub-volume (step S904).

The failover program 5024 updates the sub-storage management table 5015 (step S905). Specifically, when the sub-storage 500 is deployed in step S903, the failover program 5024 adds a record related to the sub-storage 500 to the sub-storage management table 5015. When step S903 is skipped, the failover group information is updated.

Thereafter, the processes of steps S205, S206, and S208 are performed, and then the process ends.

Figure 24:
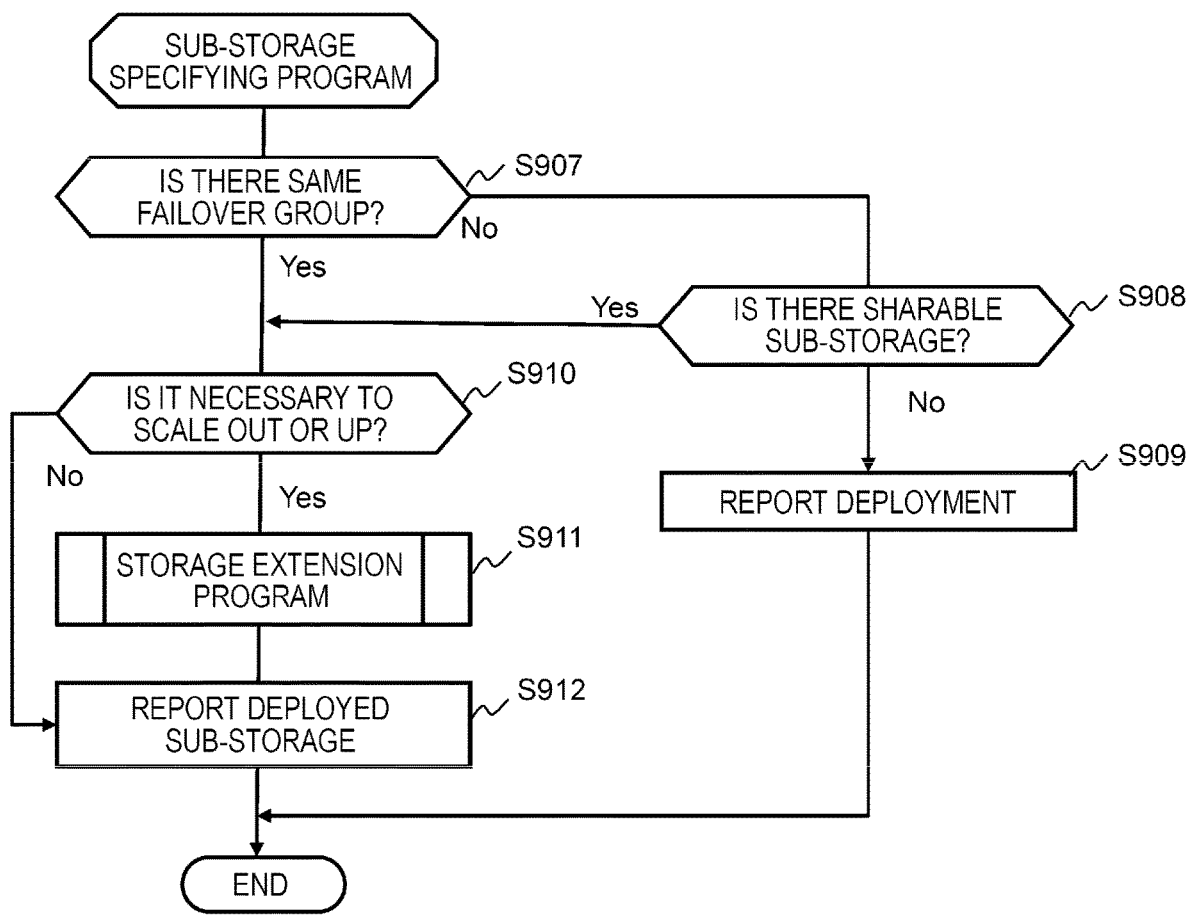
FIG. 24 is a flowchart illustrating an example of a deploying determination process.

FIG. 24 is a flowchart illustrating an example of a deploying determination process which is the process of step S902 of FIG. 23. The deploying determination process is performed by the sub-storage specifying program 5027.

In the deploying determination process, the sub-storage specifying program 5027 determines whether the failover of the same failover group as the specified regular storage 200 has already ended by using the sub-storage management table 5015 (step S907).

When the failover has ended, the sub-storage specifying program 5027 determines whether there is a sharable sub-storage 500 by using the sharable information of the sub-storage management table 5015 (step S908).

When there is no sharable sub-storage 500 (No in step S908), the sub-storage specifying program 5027 reports the deployment of the sub-storage 500 to the failover program 5024 (step S909), and then the process ends.

Conversely, when there is the sharable sub-storage 500 (Yes in step S908), the sub-storage specifying program 5027 determines whether scale-out and scale-up of the sub-storage 500 is necessary based on the availability rate of the sub-storage 500 in the sub-storage management table 5015 (step S910). For example, the sub-storage specifying program 5027 performs the scale-out and the scale-up of the sub-storage 500 so that the availability rate is a predetermined value (for example, 50%) or less, and determines additional resources.

When the scale-out and the scale-up are necessary (Yes in step S910), the sub-storage specifying program 5027 increases a capacity by adding a storage server, generating a cloud storage, and adding the cloud storage to the capacity pool (step S911). An instance type may be changed to an instance type with higher performance and lowering the availability rate of the sub-storage. Conversely, when the scale-out and the scale-up are not necessary (No in step S910), step S911 is skipped.

Thereafter, the sub-storage specifying program 5027 reports the deployed specific sub-storage 500 to the failover program 5024 (step S911), and then the process ends. When the sub-storage 500 having the resources necessary in all the failover groups sharing the sub-storage 500 is generated in step S903, only a step of determining whether the sub-storage 500 has been deployed may be performed in step S907. When the sub-storage 500 has been deployed, the deployed sub-storage 500 is failed over. When the deploying is not completed, the sub-storage 500 is newly deployed. In general, as characteristics of the cloud, necessary resources can be added at a necessary time. Therefore, after the failover, the resources may be added to the storage 500 in accordance with a load on the sub-storage 500. In this case, steps S910 and S911 are not necessary.

In step S902, the sub-storage specifying program 5027 determines whether it is necessary to deploy the sub-storage 500 by determining whether the failover group sharing the regular storage has already deployed the sub-storage 500. However, the sub-storage specifying program 5027 may select the deployed sub-storage 500 with a low load as a failover destination by using the availability rate of the sub-storage management table 5015. The plurality of regular storages 200 or the sub-storage 500 which can be shared in the failover group may be prepared in advance. In this case, the sub-storage 500 different from the sharable sub-storage 500 can be distinguished using the sharable information of the sub-storage management table 5015.

As described above, in the embodiment, since the sub-storage 500 is deployed at the time of transition, it is possible to reduce an operational cost of the sub-site.

In the embodiment, when the sub-storage 500 which has already been deployed can be shared, the sub-storage 500 is not deployed newly and the existing sub-storage 500 is used. Therefore, the operational cost of the sub-site can be reduced.

Third Embodiment

Figure 25:
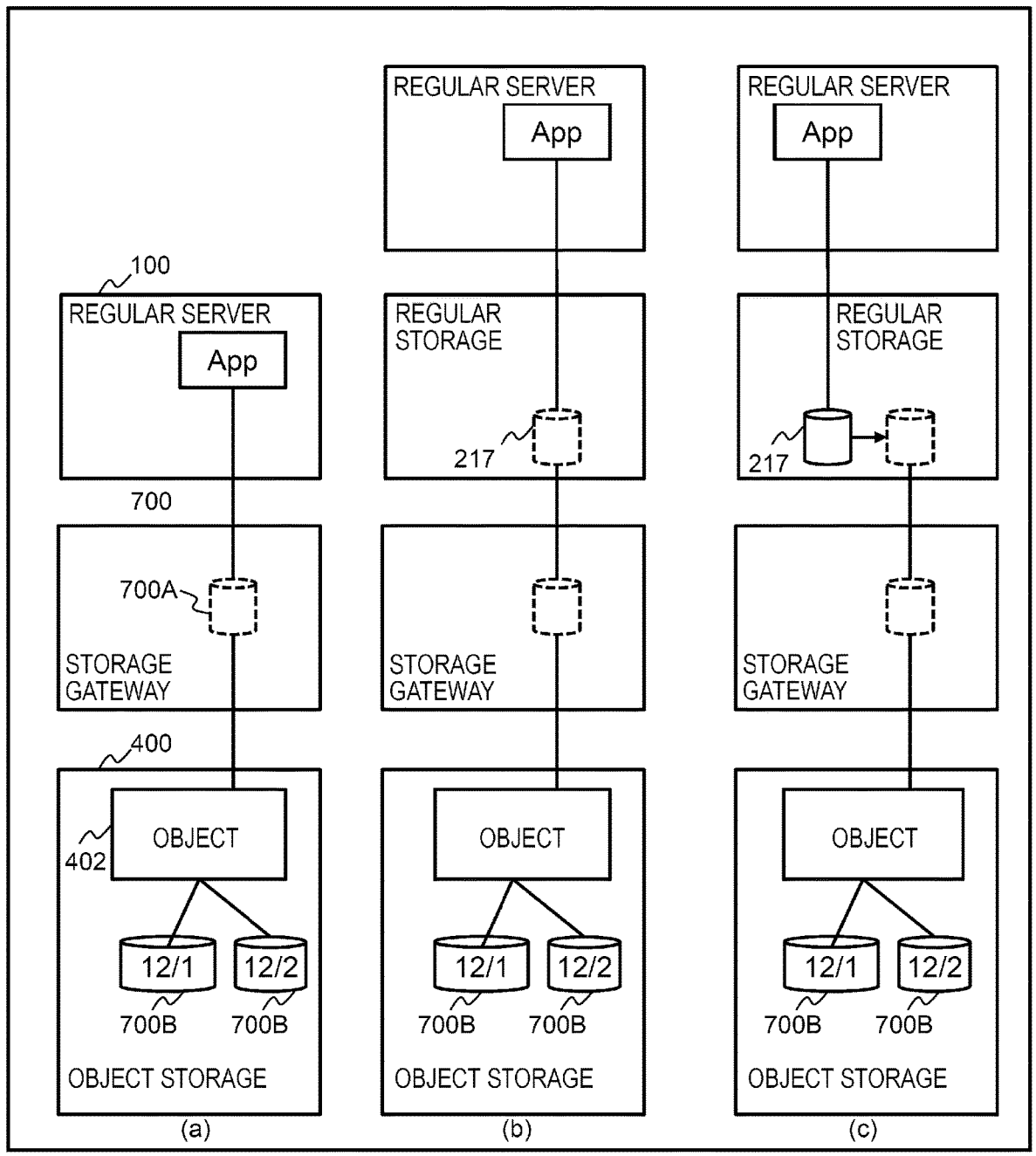
FIG. 25 is a diagram illustrating a storage system according to another embodiment.

In the first and second embodiments, the regular storage 200 acquires a snapshot periodically and the increased data is transferred to the object storage 400. However, the present disclosure can be applied to other embodiments. FIG. 25 is a diagram illustrating a storage system according to other embodiments.

Another Embodiment 1

In the present embodiment illustrated in (a) of FIG. the regular server 100 and the object storage 400 are connected to each other via the storage gateway 700. The storage gateway 700 supplies a volume 700A as a regular volume to the regular server 100. An entity of data is stored as an object 402 in the object storage 400. The object 402 according to the embodiment is not the backup data described in the first embodiment and data in a latest state used in an application program (App) of the regular server 100 is stored. In FIG. 25, one piece of data is illustrated as one object 402, but may be distributed to the plurality of objects 402. The object storage 400 may be configured in a plurality of physical servers.

A snapshot 700B of a data entity stored in the object storage 400 is acquired periodically on a cloud side (for example, the management server 501). In the example of the drawing, a snapshot 700B of the volume 700A on 1 December (12/1) and a snapshot 700B of the regular volume 217 on 2 December (12/2) are acquired. In the failover process, the failover program 5024 recovers the data to the sub-volume 509 based on the snapshot 700B in the object storage 400.

In the case of the embodiment, since a storage device storing data and the object storage 400 storing recovery data can be shared, a reduction in a cost can be achieved.

Another Embodiment 2

In the present embodiment illustrated in (b) of FIG. 25, the regular storage 200 is included in addition to the configuration illustrated in (a) of FIG. 25. In the embodiment, the volume 700A supplied by the storage gateway 700 is mapped to the regular volume 217 provided by the regular storage 200. The regular storage 200 supplies the regular server 100 with the regular volume 217 to which the volume 700A is mapped. In this case, while a reduction in a cost is achieved, characteristics of a high-capacity cache, high performance, and high functioning in the regular storage 200 can be realized.

Another Embodiment 3

In the present embodiment illustrated in (c) of FIG. 25, the regular storage 200 has a local copy function of multiplexing data of a volume in an apparatus. The regular storage 200 sets the regular volume 217 supplied to the regular server 100 as a copy source of a local copy and sets the volume 700A supplied by the storage gateway 700 as a copy destination of the local copy. Accordingly, data of the regular volume 217 of the copy source is stored in the regular storage 200 and data of the volume 700A of the copy destination is stored in the object storage 400. In this case, it is not necessary for the application program of the regular server 100 to access the object storage 400, high performance can be achieved.

By applying the data of the regular volume 217 of the copy source to the volume 700A of the copy destination periodically, it is possible to maintain the data stored in the object storage 400 in a latest state.

For example, by causing the regular storage 200 to repeat a first process of copying the data of the regular volume 217 of the copy source to the volume 700A of the copy destination and a second process in which the object storage 400 acquires the snapshot after the completion of the copy, it is possible to maintain the data stored in the object storage 400 in a latest state.

The first process includes a restarting process and a division process for the local copy. The division process is a process of temporarily stopping the copy of the data from the regular volume 217 of the copy source to the volume 700A of the copy destination. When a write request for the regular volume 217 of the copy source is generated during stopping of the copy, a writing address is recorded. The restarting process is a process of copying the data from the regular volume 217 of the copy source to the volume 700A of the copy destination. The data written on only the regular volume 217 of the copy source is copied to the volume 700A of the copy destination by using the writing address recorded in the division process. Even when a write request is generated during the copying, the writing address is recorded, and the copying is repeated until the division process is performed.

In the embodiment, it is possible to reduce an operational cost of the sub-site as in the first and second embodiments.

Each of the above-described embodiments of the present disclosure is an example for describing the present disclosure and the scope of the present disclosure is not limited to the embodiments. It should be apparent to those skilled in the art without departing from the scope of the present disclosure and present disclosure can be embodied in other various forms.

What is claimed is:

1. A storage system comprising:
a first storage apparatus configured to store data in response to a read/write request from a first host;
a recovery storage apparatus configured to store recovery data for recovering the data; and
a management apparatus configured to cause a second host to perform a business process using the data,
wherein the second host is stopped in advance, and
wherein, when the second host is caused to perform the business process, the management apparatus prepares a second storage apparatus, causes the second storage apparatus to recover and store the data using the recovery data, and starts the second host based on control information for designating the second storage apparatus operating in response to a request from the second host,
wherein, based on the control information, the management apparatus prepares the second storage apparatus by deploying the second storage apparatus so that the second storage apparatus has a storage capacity in which the data is storable,
wherein the management apparatus prepares the second storage apparatus in units of regular volumes supplied for the first host to store the data in the first storage apparatus or in units of groups including one regular volume or a plurality of regular volumes, and
wherein the management apparatus determines whether data related to the regular volume or the group is recovered to the second storage apparatus prepared in advance based on the control information when the second storage apparatus is prepared, the management apparatus increases a capacity of the second storage apparatus based on the control information when data is recovered to the second storage apparatus prepared in advance, and the management apparatus deploys the second storage apparatus newly when data is not recovered to the second storage apparatus prepared in advance.

2. A storage system comprising:
a first storage apparatus configured to store data in response to a read/write request from a first host;
a recovery storage apparatus configured to store recovery data for recovering the data; and
a management apparatus configured to cause a second host to perform a business process using the data,
wherein the second host is stopped in advance,
wherein, when the second host is caused to perform the business process, the management apparatus prepares a second storage apparatus, causes the second storage apparatus to recover and store the data using the recovery data, and starts the second host based on control information for designating the second storage apparatus operating in response to a request from the second host, and
wherein, when a business process in which the data is used is performed in the first storage apparatus, the management apparatus stops the second host, copies data stored in the second storage apparatus to the first storage apparatus, and returns to a state before the second storage apparatus is prepared.

* * * * *